United States Patent
Schemmann et al.

(10) Patent No.: US 9,444,549 B2
(45) Date of Patent: Sep. 13, 2016

(54) SYSTEMS AND METHODS FOR BURST DETECTION IN A CATV NETWORK

(71) Applicant: ARRIS Enterprises, Inc., Suwanee, GA (US)

(72) Inventors: Marcel F. Schemmann, Maria Hoop (NL); Venkatesh G. Mutalik, Middletown, CT (US)

(73) Assignee: ARRIS Enterprises, Inc., Suwanee, GA (US)

( * ) Notice: Subject to any disclaimer, the term of this patent is extended or adjusted under 35 U.S.C. 154(b) by 11 days.

(21) Appl. No.: 14/625,613

(22) Filed: Feb. 18, 2015

(65) Prior Publication Data

US 2015/0304041 A1 Oct. 22, 2015

Related U.S. Application Data

(60) Provisional application No. 62/043,793, filed on Aug. 29, 2014, provisional application No. 62/052,213, filed on Sep. 18, 2014, provisional application No. 61/984,303, filed on Apr. 25, 2014, provisional application No. 61/982,089, filed on Apr. 21, 2014.

(51) Int. Cl.
*H04J 14/00* (2006.01)
*H04B 10/2575* (2013.01)
*H04B 10/27* (2013.01)
(Continued)

(52) U.S. Cl.
CPC ...... *H04B 10/25751* (2013.01); *H04B 10/075* (2013.01); *H04B 10/2503* (2013.01); *H04B 10/2507* (2013.01); *H04B 10/2575* (2013.01); *H04B 10/27* (2013.01); *H04B 10/272* (2013.01); *H04B 10/29* (2013.01); *H04B 10/50* (2013.01); *H04B 10/516* (2013.01); *H04B 10/564* (2013.01); *H04B 10/58* (2013.01); *H04J 14/02* (2013.01); *H04N 7/22* (2013.01);
(Continued)

(58) Field of Classification Search
CPC .......... H04B 10/25751; H04B 10/075; H04B 10/2503; H04B 10/2507; H04B 10/2575; H04B 10/27; H04B 10/272; H04B 10/29; H04B 10/50; H04B 10/516; H04B 10/564; H04B 10/58; H04J 14/02; H04J 14/0235; H04J 14/0249; H04J 14/025; H04J 14/0252; H04N 7/22
USPC ................................................... 398/72, 67
See application file for complete search history.

(56) References Cited

U.S. PATENT DOCUMENTS 5,262,883 A 11/1993 Pidgeon
5,331,449 A 7/1994 Huber et al.
(Continued)

FOREIGN PATENT DOCUMENTS

EP 0858435 A2 8/1998
EP 1235434 A2 8/2002
(Continued)

OTHER PUBLICATIONS

PCT Invitation to Pay Additional Fees (Form ISA/206), Re: Application No. PCT/US2015/023994; dated Jul. 2, 2015.
(Continued)

*Primary Examiner* — M. R. Sedighian
(74) *Attorney, Agent, or Firm* — Lori Anne D. Swanson

(57) ABSTRACT

Systems and methods for detecting laser transmission bursts in a CATV network.

10 Claims, 19 Drawing Sheets

(51) Int. Cl.

| | |
|---|---|
| *H04J 14/02* | (2006.01) |
| *H04B 10/2507* | (2013.01) |
| *H04B 10/29* | (2013.01) |
| *H04B 10/50* | (2013.01) |
| *H04B 10/25* | (2013.01) |
| *H04B 10/516* | (2013.01) |
| *H04B 10/564* | (2013.01) |
| *H04B 10/075* | (2013.01) |
| *H04B 10/272* | (2013.01) |
| *H04B 10/58* | (2013.01) |
| *H04N 7/22* | (2006.01) |

(52) U.S. Cl.
CPC ......... *H04J 14/025* (2013.01); *H04J 14/0235* (2013.01); *H04J 14/0249* (2013.01)

(56) References Cited

U.S. PATENT DOCUMENTS

| | | | |
|---|---|---|---|
| 5,914,799 | A | 6/1999 | Tan |
| 6,041,056 | A | 3/2000 | Bigham et al. |
| 7,941,022 | B1 | 5/2011 | Schaffner et al. |
| 7,944,848 | B2* | 5/2011 | Chappell ............ H04L 12/2801 370/252 |
| 8,837,953 | B2 | 9/2014 | Mutalik et al. |
| 9,136,970 | B2* | 9/2015 | Wellbrock ......... H04B 10/0799 |
| 2002/0101630 | A1* | 8/2002 | Nikolich ............ H04B 10/077 398/129 |
| 2006/0110161 | A1* | 5/2006 | Cho .................... H04B 10/071 398/72 |
| 2010/0239251 | A1 | 9/2010 | Biegert et al. |
| 2012/0219289 | A1 | 8/2012 | Hayashi et al. |

FOREIGN PATENT DOCUMENTS

| | | |
|---|---|---|
| EP | 1235434 B1 | 10/2005 |
| WO | 2012/154388 A1 | 11/2012 |

OTHER PUBLICATIONS

PCT Search Report and Written Opinion, Re: Application No. PCT/US2015/023994; dated Sep. 8, 2015.

"OBI free", retrieved from the Internet at <http://www.emc-web.com/J_emc/index.php?option=com_content&view=article&id=165:obi-free&catid=47:paper&Itemid=182\> on Mar. 24, 2015.

A. Tan, "Super PON-A Fiber to the Home Cable Network for CATV and POTS/ISDN/VOD as Economical as a Coaxial Cable Network", Journal of Lightwave Technology, vol. 15, No. 2, Feb. 1997, pp. 213-218.

"HRL Laboratories, LLC: About Us", retrieved from the Internet at <http://www.hrl.com/aboutUs/abt_main.html> on Mar. 24, 2015.

A. Al-Banna, et al., "Beat it! Handling Optical Beat Interference in RFOG Systems", ARRIS White Paper, ARRIS Enterprises, Inc., 2014, 31 pgs.

V. Mutalik, et al., "Partnership for Extended Capacity: DOCSIS 3.1 with RFoG", ARRIS White Paper, 2013, 18 pgs.

V. Mutalik, et al., "Partnership for Extended Capacity: DOCSIS 3.1 with RFoG", ARRIS PowerPoint Presentation, 2014 Spring Technical Forum, Apr. 30, 2014.

* cited by examiner

SYSTEMS AND METHODS FOR BURST DETECTION IN A CATV NETWORK

CROSS-REFERENCE TO RELATED APPLICATIONS

This application claims the benefit of priority under 35 U.S.C. §119(e) to U.S. Provisional Application No. 62/043,793 filed on Aug. 29, 2014, U.S. Provisional Application No. 62/052,213, filed on Sep. 18, 2014, U.S. Provisional Application No. 61/984,303 filed on Apr. 25, 2014, and U.S. Provisional Application No. 61/982,089, filed on Apr. 21, 2014.

BACKGROUND

The present disclosure relates to systems and methods that process signals over a cable transmission network.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Cable television (CATV) networks have continuously evolved since first being deployed as relatively simple systems that delivered video channels one-way from a content provider. Early systems included transmitters that assigned a number of CATV channels to separate frequency bands, each of approximately 6 MHz. Subsequent advancements permitted limited return communication from the subscribers back to the content provider either through a dedicated, small low-frequency signal propagated onto the coaxial network. Modern CATV networks, however, provide for not only a much greater number of channels of content, but also provide data services (such as Internet access) that require much greater bandwidth to be assigned for both forward and return paths. In the specification, the drawings, and the claims, the terms "forward path" and "downstream" may be interchangeably used to refer to a path from a head end to a node, a node to an end-user, or a head end to an end user. Conversely, the terms "return path" "reverse path" and "upstream" may be interchangeably used to refer to a path from an end user to a node, a node to a head end, or an end user to a head end.

Recent improvements in CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A key benefit of RFoG is that it provides for faster connection speeds and more bandwidth than current coaxial transmission paths are capable of delivering. For example, a single copper coaxial pair conductor can carry six simultaneous phone calls, while a single fiber pair can carry more than 2.5 million phone calls simultaneously. FTTP also allows consumers to bundle their communications services to receive telephone, video, audio, television, any other digital data products or services simultaneously.

One existing impairment of RFoG communication channels is Optical Beat Interference (OBI), which afflicts traditional RFoG networks. OBI occurs when two or more reverse path transmitters are powered on, and are very close in wavelength to each other. OBI limits upstream traffic, but also can limit downstream traffic. Existing efforts at mitigating OBI have focused on Optical Network Units (ONUs) at the customer premises, or on the CMTS at the head end. For example, some attempts to mitigate OBI make the ONUs wavelength specific while other attempts create an RFoG-aware scheduler in the CMTS. Still others attempts have included changing ONU wavelengths on the fly. Due to the fundamental nature of lasers and DOCSIS traffic, none of the above techniques yield satisfactory results as wavelength collisions still occur or cost is high. Thus, it may be desirable in RFoG deployments to further reduce or eliminate OBI.

DETAILED DESCRIPTION

Figure 1:
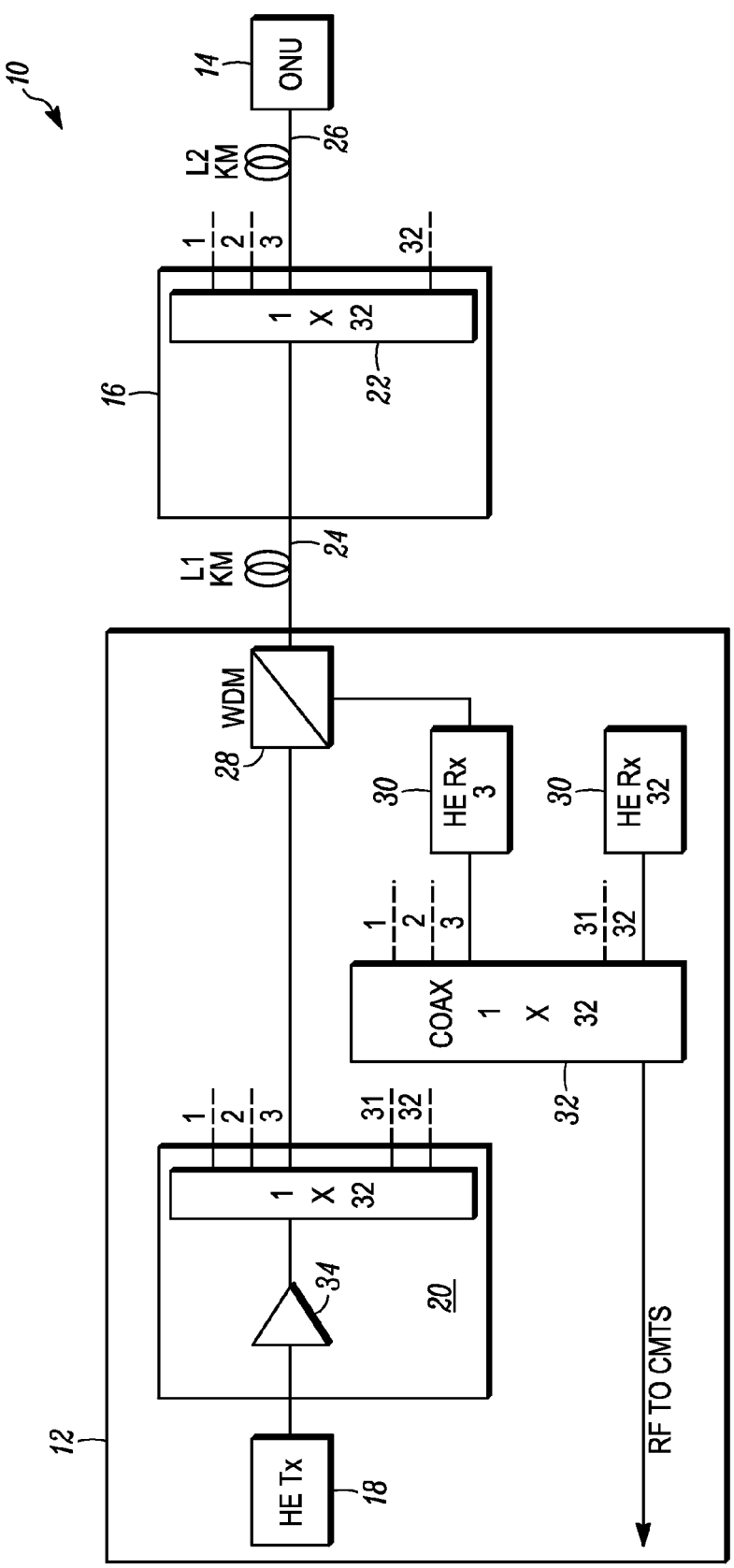
FIG. 1 shows an existing RFoG architecture.

FIG. 1 shows an exemplary existing RFoG system 10, where a head end 12 delivers content to an ONU 14 at a customer's premises through a node 16. An RFoG topology includes an all-fiber service from the head end 12 to a field node or optical network unit (ONU), which is typically located at or near the user's premises. In the head end 12, a downstream laser sends a broadcast signal that is optically split multiple times. The optical network unit, or ONU, recovers the RF broadcast signal and passes it into the subscriber's coax network.

The head end 12 typically includes a transmitter 18 that delivers a downstream signal to one or more 1×32 passive splitters 20 that includes 32 output ports, each output port connected to a wavelength division multiplexer (WDM) splitter 28 that delivers the downstream content over a fiber transmission segment 24 to the node 16, which in turn includes another 1×32 splitter 22, where each output port of the splitter 22 is connected via another fiber segment 26 to a particular ONU 14 at a subscriber's premises.

Optical networking units (ONUs) in an RFoG environment terminate the fiber connection at a subscriber-side interface and convert traffic for delivery over the in-home network at the customer premises. Coaxial cable can be used to connect the ONUs of an RFoG network to one or more user devices, where the RFoG user devices can include cable modems, EMTAs, or set-top boxes, as with the user devices of an HFC network. For example, the ONU 14 may connect to set-top boxes, cable modems, or similar network elements via coaxial cable, and one or more of the cable modems may connect to the subscriber's internal telephone wiring and/or to personal computers or similar devices via Ethernet or Wi-Fi connections.

Those of ordinary skill in the art will appreciate that the foregoing architecture is illustrative only. For example, the number of ports of the splitters 20 and 22 may be changed, as desired. It should also be understood that the head end 12 may include more splitters 20, each splitter having outputs connected to a respective node so as to serve a great number of subscribers.

Along the return path from the subscriber's ONU 14 to the head end 12, the splitter 22 operates as a combiner, i.e. up to 32 ONUs may deliver return path signals to the node 16, which combines them for upstream transmission along fiber length 24. Each of the signals from the respective ONU's 14 is then separated from other signals by the WDM 28 to be received by a separate receiver 30 in the head end 12. The signals from the respective receivers are then combined by a combiner 32 for transmission to a Cable Modem Termination Service (CMTS) in the head end 12. The signals are combined in the RF domain in the head end 12 by the combiner 32, before being connected to the CMTS upstream port. Combined with the forward power limit on the fiber, the combined signals requires one forward fiber (L1 km) per group of 32 subscribers.

In the forward direction, the forward transmitter is provided to a higher power multi-port amplifier that distributes power. For example, in the head end 12, the transmitter 18 provides output to an Erbium Doped Fiber Amplifier (EDFA) 34 that internally distributes power over the 32 outputs of the combiner 20, each output operated at a relatively high power, e.g. approximately 18 decibel-milliwatts (dBm). The WDM 28 typically passes 1550 nm light from the EDFA 34 in forward direction and directs reverse light, typically at 1610 nm or perhaps 1310 nm in the reverse direction to the receivers 30. The WDM 28 may be connected to a fiber of length L1 that feeds the splitter 22 in the node 16. The outputs of the splitter 22 are each provided to second fibers of length L2 that are respectively connected to ONUs 14 at the subscriber homes. Typically, L1+L2 may be up to 25 km. The ONUs 14 convert the forward transmitted light to RF signals for the in-home coaxial network. The ONUs 14 also receive RF signals from the in-home network and modulate these signals onto a laser, operating at 1610 nm for example, and the laser's output is sent upstream into the fiber L2. The upstream signal is combined with other upstream signals in the combiner 22 and transmitted further upstream in the fiber L1. At the WDM 28 the upstream signals are directed towards the head end receivers 30.

The loss budget for 32 subscribers and 25 km of fiber requires one receiver in the head end 12 for every group of 32 subscribers; given an upstream transmission power of 3 dBm, the receivers 30 and the WDM 28 may typically operate at a power between −18 and −21 dBm, making a good signal to noise ratio challenging, such that band limited receivers are usually required for acceptable performance. Furthermore, the passive optical combiner 22 that combines multiple optical inputs to a single output by definition creates OBI between these inputs, as described earlier and will therefore create noise in the RF domain at the head end receivers 30. Furthermore, a loss of around 24 dB must also be assumed in the forward path; for an EDFA output power of 18 dBm per port, this provides −6 dBm power to the receivers. This is sufficient for acceptable performance at the ONU to 1 GHz, provided low noise, high gain receivers are used.

The disclosed techniques for eliminating OBI is desirable, and the disclosed manner for eliminating OBI as disclosed may enable higher capacity in the upstream and downstream. Further, the disclosed combiner and features of the combiner may enable RFoG coexistence alongside traditional HFC/D3.1 systems and future potential PON systems. The elimination of OBI is critical in some systems to unlock the vast potential of the optical fiber. Described in more detail herein are embodiments for an architecture that incorporates the disclosed optical combiner system.

Figure 2:
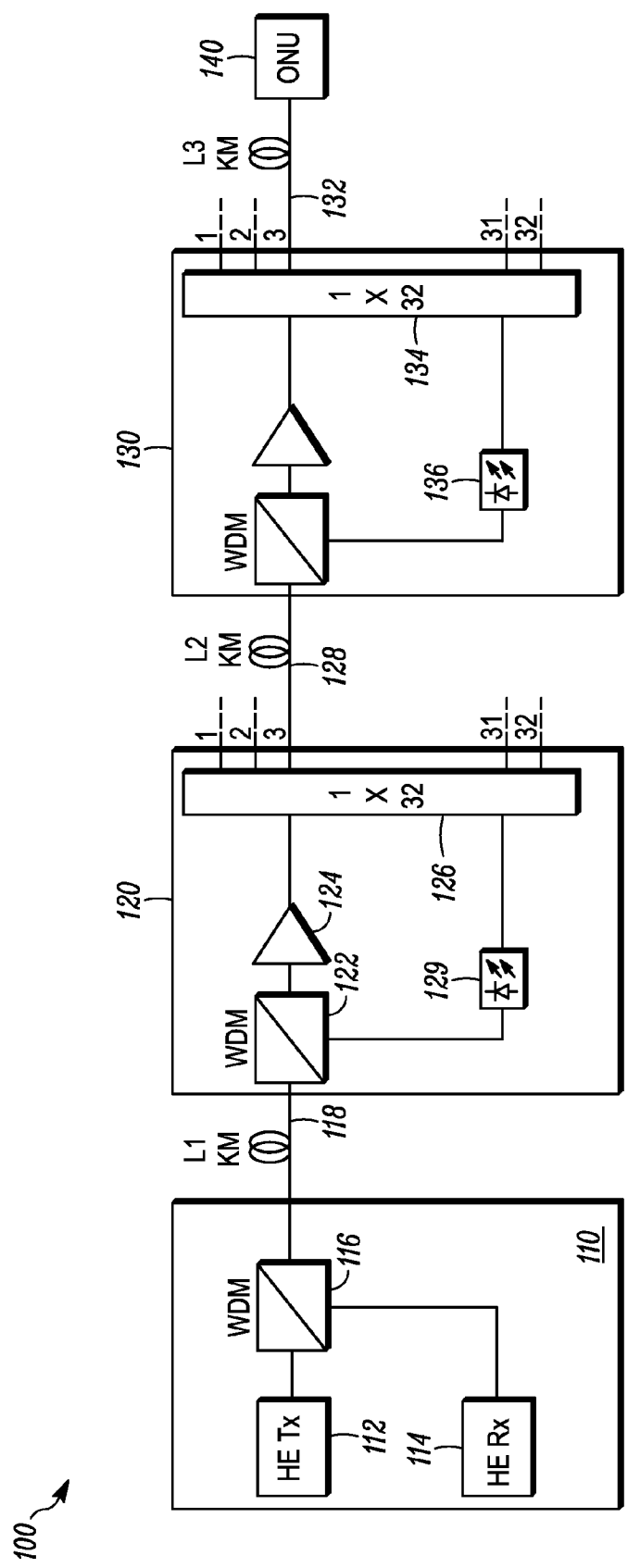
FIG. 2 shows an improved RFoG architecture.

FIG. 2 shows an improved system 100 for delivering CATV content to a plurality of subscribers over an RFoG network. The architecture shows a head end 110 having a transmitter 112 and receiver 114 each connected to a WDM splitter 116 that outputs a signal to, and receives a signal from, a fiber link 118 of L1 km. The fiber link 118 is connected to an active splitter/combiner unit 120. The splitter/combiner unit 120 may preferably include a WDM 122 that separates forward path signals from reverse path signals. The forward path signal from the WDM 122 is provided to an EDFA 124 that outputs an amplified optical signal to an active 1×32 splitter 126 that has 32 output ports, each to respective second fiber links 128. At each port, the power level can be modest (e.g. in the 0-10 dBm range) but can also be high (e.g. in the 18 dBm range).

In the reverse direction, the 1×32 port splitter 126 operates as an active combiner 126, and includes, at each port, a WDM that directs upstream light to a detector at the port, which converts received optical signals to electrical signals, amplifies them in the RF domain, and provides the electrical signals to a transmitter 129 that outputs light at, for example, 1610 nm, 1310 nm, or some other appropriate wavelength, provided to the WDM 122, which in turn directs the upstream light into fiber 118. At the head end 110, the fiber 118 is connected to WDM 116 that directs the upstream light to the receiver 114.

Each of the 32 ports of the splitter/combiner 126, through a respective fiber 128, output a respective signal to a second active splitter/combiner unit 130 of the same type and configuration as the splitter/combiner unit 120. The length(s) of the fiber 128 may vary with respect to each other. The output power per splitter port is low, around 0 dBm. The splitter ports are connected to ONUs 140, for instance in a Multiple Dwelling Unit (MDU) or a neighborhood, via fiber 132 of length L3. In a basic RFoG system, the sum of the fiber lengths L1+L2+L3 is up to 25 km. The system 100, however, will permit a higher total length of fiber between the head end 110 and the ONUs 140, such as 40 km, because the system 100 can tolerate a higher SNR loss, as further described below.

The upstream signals from the ONU 140 are individually terminated directly at the active splitter/combiner unit 130; even for ONUs operating at 0 dBm, the power reaching the detectors is around −2 dBm (the fiber 132 is a short fiber up to a few km, and the WDM loss inside the active combiner is small). This is almost 20 dB higher than in existing RFoG systems, meaning that the RF levels after the detector in the splitter 134 is almost 40 dB higher than in existing RFoG systems. As a consequence, the receiver noise figure is not critical, and high bandwidth receivers can be used with relatively poor noise performance. The received RF signal is re-transmitted via the transmitter 136 along the reverse path into fiber 128 and received and retransmitted by the preceding active splitter/combiner unit 120 and thereafter to the head end 110. Although the repeated re-transmission leads to some incremental reduction in SNR, improvements in SNR from the active architecture provides much greater overall performance relative to traditional RFoG systems. More importantly, because all reverse signals are individually terminated at separate detectors, there can be no optical beat interference (OBI) between different reverse signals. The reverse signals are not combined optically, hence OBI cannot occur.

Figure 14:
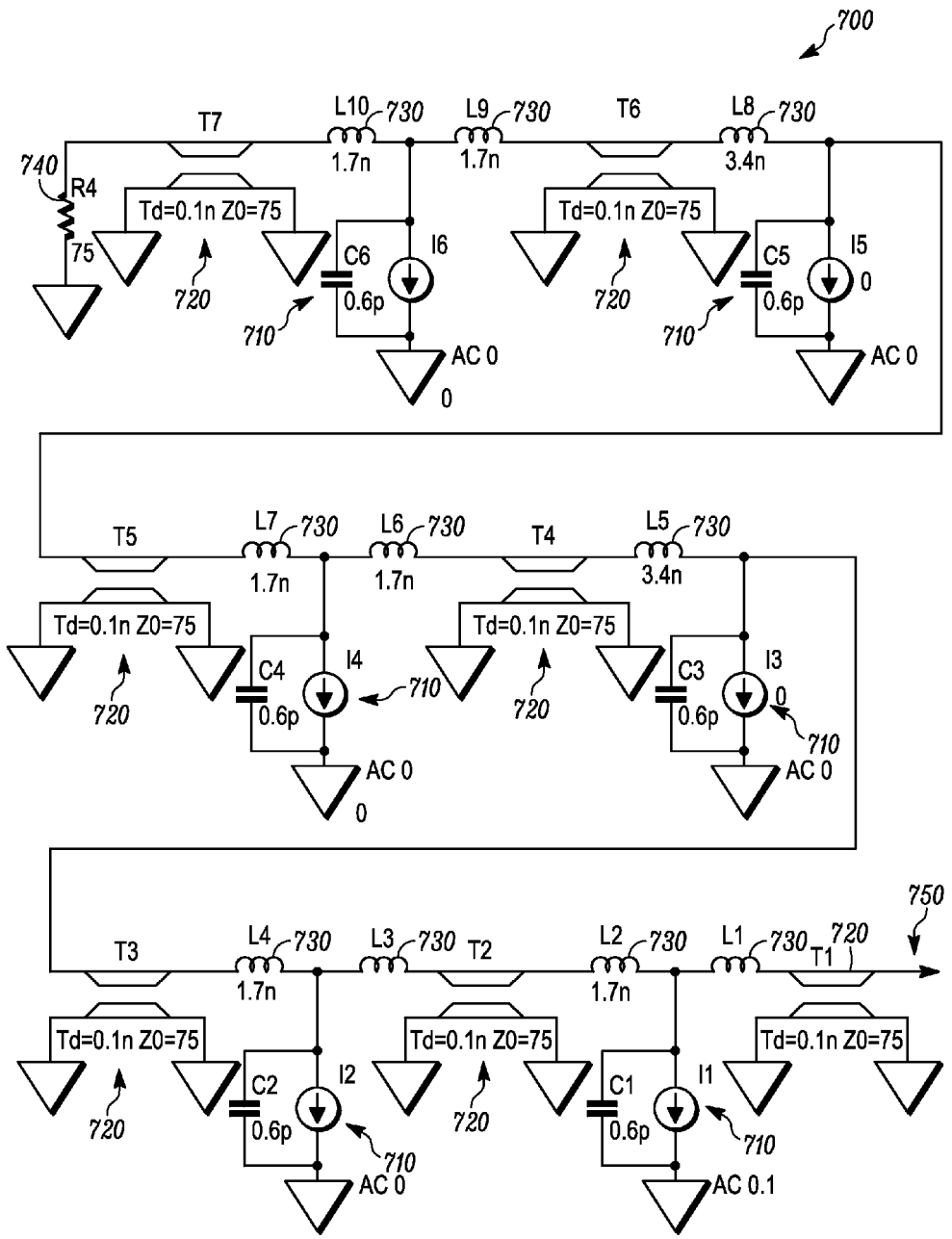
FIG. 14 shows a transmission line receiver structure.

Although in some embodiments, the RF splitter/combiner units such as 120 and 130 may use an RF combiner to combine respective electrical signals from each detector at each port, this may produce unacceptable losses in the upstream transmission from the ONU to the head end. Therefore, the RF splitter/combiner units 120 and 130 preferably have the detectors arranged in a transmission line structure such as shown in FIG. 14, which will not incur such high signal loss.

In the forward direction there may be multiple EDFAs, such as EFDA 124 in the splitter/combiner unit 120; these EDFAs are cost effective single stage devices with low power dissipation—typically 2 Watts or less. Cascading the EDFAs results in an accumulation of noise due to the finite noise figures of the EDFAs. Whereas the active splitter architecture does not require the EDFAs, since an EFDA (not shown) in a high power head end 110 could still be used to provide power to the ONUs 140, the use of EDFAs, such as the EFDA 124, inside the active splitter units provides some advantages. For example, the complexity and power dissipation of equipment in the head end 110 is greatly reduced, as is the fiber count emanating from the head end 110. The amount of power delivered to the ONUs 140 is readily increased to approximately 0 dBm from −6 dBm in a traditional RFoG system. As a consequence, ONU receivers obtain 12 dB more RF level from their detectors and do not need as high a gain or a low a receiver noise contribution. Even with relaxed noise requirements at the ONU receivers, the SNR impact due to EDFA noise is easily overcome due to the higher received power. In addition, more spectrum can be supported in the forward direction with an acceptable SNR relative to current architectures, such as 4 GHz instead of 1 GHz in current RFoG, hence total data throughput rates can grow significantly without a change in operation to permit for example, services that provide 40 Gbps download speeds and 10 Gbps upload speeds.

In some embodiments, the optical combiner provides upstream and downstream RFoG capability and a completely transparent and reciprocal avenue for PON transmission. The optical combiner may enable complete transparency for PON deployments. For example, the optical combiner may enable OBI-free and high capacity features by deployment in compatible HFC D3.1 capable FTTH networks. Likewise, the optical combiner may be incorporated in to GPON, 1G-EPON, XGPON1, 10G/1G-EPON, 10G/10G-EPON. The compatibility with HFC and D3.1 enables the disclosed optical combiner to be deployed alongside a current HFC network, and is D3.1 ready. The optical combiner may be deployed on a fiber node, on multiple dwelling unit (MDU) and on single family home (SFU) deployments.

Embodiments for an RFoG combiner include preventing or eliminating OBI at the combiner as opposed to managing it at the extremities of the network (such as using a CMTS scheduler at the head end side of the network or wavelength specific ONUs at the subscriber end of the network). Embodiments are described that enable elimination of OBI. The disclosed optical combiner may be used to eliminate OBI, enhance capacity, and/or enable multiple services in RFoG, the cable version of FTTH networks.

The disclosed optical combiner may be independent of ONUs, Cable Modems and CMTSs. The disclosed optical combiner may be CMTS-agnostic, thus eliminating the need to create an RFoG-aware scheduler, which is both restrictive and time consuming. The optical combiner makes a cable version of FTTH more feasible, as compared to the PON alternatives. For example, in embodiments, the disclosed optical combiner has a reciprocal PON pass-thru capability of the optical combiner along with a high upstream and downstream capacity, which assists RFoG deployment without interruption to the underlying system, or impairing future inclusion of PON functionality, such as later PON deployment on an RFOG system.

In some embodiments, the optical combiner has 32 ports, but only requires one transmit port, one receive port, and one WDM component at the headend. Thus, instead of requiring 32 WDMs and 32 receive ports, the disclosed optical combiner may save on head end space and power. The combiner may be an active device that needs approximately 2 Watts of power. The optical combiner may be powered by power sources readily available in the RFoG system, or power can be provisioned into the optical combiner. The power source may include a battery back-up or solar/fiber power alternatives. If the power is lost and the battery has also drained, the entire reciprocal PON transmission is unaffected. The upstream RFoG transmission is however stopped. In a conventional RFoG system it would have been stopped also because the preponderance of OBI would have severely impaired the system anyway if the system was a traditional RFoG system with a passive combiner. Also in case of power loss, ONU (Optical Networking Unit) at the homes would cease to function such that without any power backup such systems will cease to function, whether those are RFoG or PON systems, with or without the active combiner disclosed here. The head end optical receiver 114 may only need an input power range from 0 . . . −3 dBm, and require 15 dB less RF output power due to the absence of the RF combiner such that with such a high optical input power and low RF output power requirement the gain can be low.

The disclosed optical combiner may preferably eliminate OBI, making an OBI-free system. The optical combiner enables long reach and large splits, e.g. up to 40 km and 1024 splits, which will expand even further. The high upstream and downstream capacity enabled by the disclosed optical combiner includes up to 10G DS/1G US, and as high as 40G DS/10G US.

In embodiments, the disclosed optical combiner prevents interference in RFOG deployments in the combiner rather than preventing interference using measures taken in the ONU where previous attempts have failed or proven to be cost-prohibitive.

Figure 3:
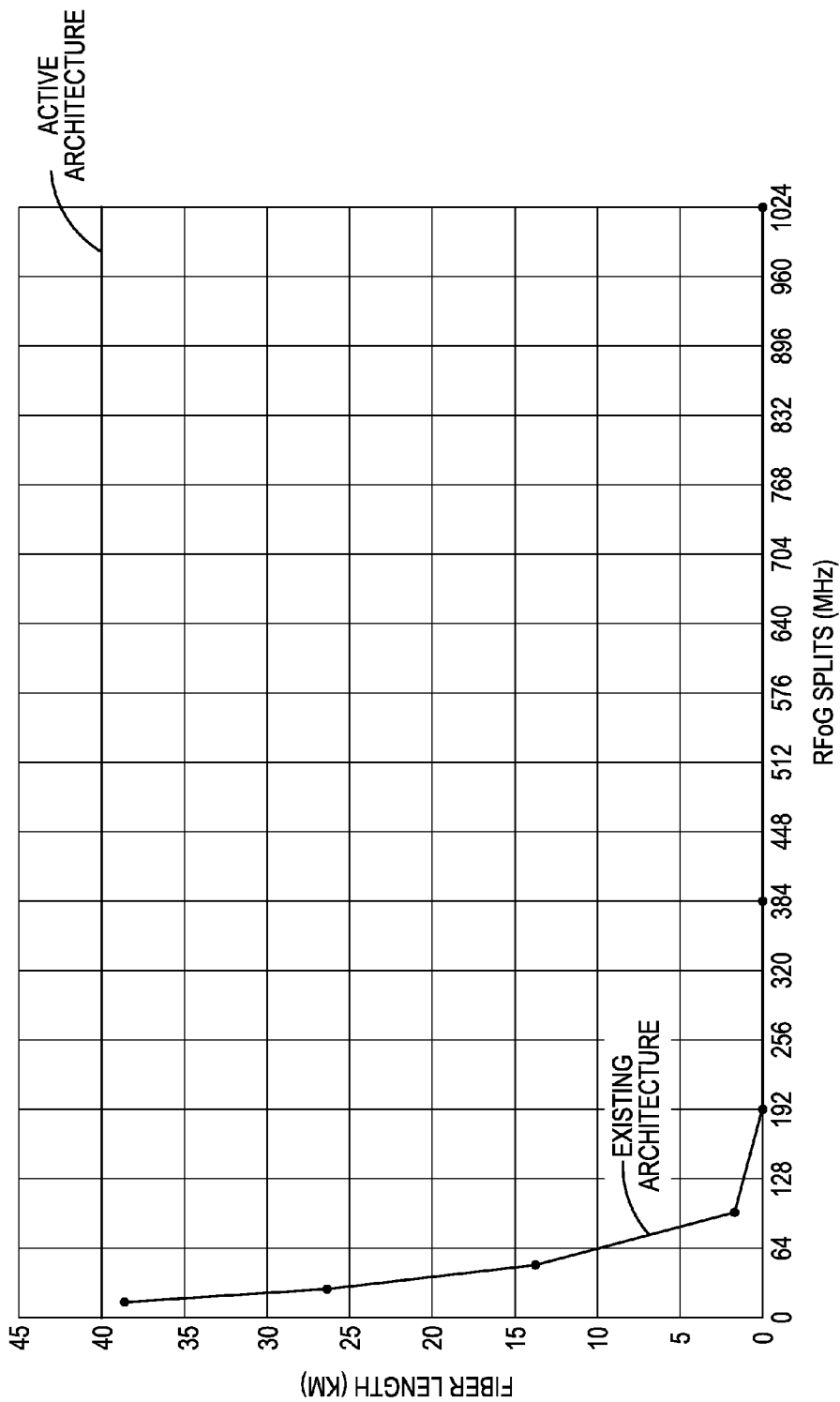
FIG. 3 compares capabilities of the architectures of FIGS. 1 and 2.

Traditional RFoG architectures have a fixed power budget. This means that as fiber length between the head end and the ONUs increases, a smaller number of splits may be used, as can be seen in FIG. 3 where the lower, curved line represents the existing architecture and the upper, curved line represents the active architecture disclosed herein. Conversely, the more splits that are desired, the less fiber length may be deployed. The disclosed active architecture, however, enables fiber length of up to approximately 40 km irrespective of the number of splits used, meaning that the disclosed active architecture permits fiber lengths of 40 km or more along with a large number of splits, e.g. 1024, thereby advancing FTTP topology and deployment.

The overall cost of the active splitter architecture shown in FIG. 2 is similar to that of a traditional RFoG solution. The cost of active splitter EDFA gain blocks and WDM and detector components in the active architecture is offset by the elimination of head end gear such as receivers, high power EDFAs and combiners. A cost reduction of the ONUs that can operate with lower output power further supports the active splitter architecture. Further advantages of the active splitter architecture may include a reduction in outgoing fiber count from the head end, which can have a large impact on system cost, as well as an option to use 1310 nm reverse ONUs while staying within a typical SNR loss budget, which can further reduce costs. Also, the system shown in FIG. 2 exhibits increased bandwidth relative to what existing RFOG architectures are capable of providing, avoiding limits on service group sizes and concomitant requirements for more CMTS return ports. Finally, unlike OBI mitigation techniques in existing RFOG architectures, the system shown in FIG. 2 does not require cooled or temperature controlled optics and bi-directional communication links that necessitate additional ONU intelligence.

Each of these factors provides a further cost advantage of an active splitter solution over existing RFOG architectures. Required space and power in the head end is also reduced; the active splitter solution requires one transmit port, one receive port and one WDM component. Existing RFoG architectures, on the other hand, requires transmit ports, multi-port high power EDFAs, 32 WDM's, 32 receiver ports, and a 32-port RF combiner. Existing RFoG architectures require very low noise, high gain, and output power receivers with squelch methods implemented to overcome power loss and noise addition in the RF combiner. The system 100 shown in FIG. 2, conversely, works with input power normally in the 0-3 dBm range, little gain is required, and requires 15 dB less power output due to the absence of the RF combiner before the CMTS.

Preferably, the disclosed optical combiner unit implements a transmission line approach to combine multiple optical photodetectors in a single optical receiver. This may be accomplished in unidirectional or bidirectional configurations. A unidirectional system provides no control communication signals from an active optical splitter to an ONU, i.e. control communication signals only pass from an ONU to an active splitter. Thus, in a unidirectional system, an active optical splitter simply accepts an output level from an ONU and operates with that output level. A bidirectional system passes control signals from an active optical splitter to ONUs instructing them to adjust their output power; this type of system permits accurate equalization of the input levels to the active optical splitter from each ONU.

Some active splitter/combiner systems may preferably include redundancy where active optical splitters switch their return laser power (the return laser that carries the combined information of the ONUs connected to it) between a high and a low power state or operates this laser in CW mode. In that case an upstream head end or active optical splitter can easily detect loss of power at an input port and enable a second input port connected to another fiber route to receive the information; in the forward path, the other fiber route would also be activated in this case because generally the forward and reverse light share the same fiber. Also, some active splitter/combiner systems may include a reverse laser in the active optical splitter that adjusts its power output as a function of the number of ONUs transmitter to the active optical splitter and the photocurrent received from these ONUs. Still other active splitter/combiner systems may have a gain factor and reverse laser power of the active optical splitter set to a fixed value.

Preferably, the disclosed optical combiner unit is able to configure itself under changing circumstances. Instances occur in which cable modems in the ONU are required to communicate with the CMTS even if there is no data to be transmitted. Usually, however, the ONU is turned off during periods when there is no data to be transmitted between the ONU and CMTS, and a cable modem could go hours before receiving or sending data. Thus, in some embodiments the disclosed combiner unit may be configured to stay in communication with the CMTS. Cable modems may be required to communicate back to the CMTS once every 30 seconds, or some other appropriate interval.

ONU Operational Modes and Laser Clipping Prevention

In traditional RFoG architectures, ONUs transmit information in bursts and at any point in time one or more ONUs can power on and begin transmitting information. As required by the DOCSIS specification, all ONUs are polled repeatedly with an interval up to 5 minutes but usually less. When an ONU turns on, the optical power transmitted by the ONU rises from zero to the nominal output power in a short time. As a consequence, the optical power received by the active splitter from that ONU goes through that same transition. The slew rate with which the ONU can turn on is constrained by the DOCSIS specification, but the transition is still relatively abrupt, resembling a step function. As is well known from signal theory, a step function has a frequency spectrum that contains significant energy in the low frequencies, with declining energy as frequency rises. If the low frequency energy were allowed to be re-transmitted unimpeded by the active splitter laser when retransmitting signals, then the signal could readily overdrive the laser and cause laser clipping. To avoid such clipping, several approaches may be utilized.

First, a steep high pass filter may be implemented after the detectors of the active splitter, which ensures that the low frequency signals induced in the photo detectors from ONUs that power on and off do not overdrive the laser used for retransmission. Such a high pass filter should be constructed so that it presents low impedance to the photo detectors for low frequencies, such that the photo detectors do not see a significant bias fluctuation when ONUs cycle on and off. For instance, if a coupling capacitor were used as the first element in a filter that presents high impedance to the photo-detectors, then an ONU that turns on could result in a significant bias fluctuation of the photo detectors; such a filter should preferably not be used. In this context, a significant bias fluctuation would be a fluctuation of greater than 10%. Preferably, the high pass filter is configured to limit fluctuations to levels well below this figure, e.g. 5% or even 2%. Also, if the re-transmitting laser is used in burst mode, then the slew rate of the retransmitting laser should preferably be limited when it turns on, so as to limit the amount of low frequency spectrum into the photo-detectors of preceding active splitter units.

As noted above, ONUs normally operate in burst mode and this causes the associated problems just described. Burst mode operation of the ONUs is required in an existing RFoG architecture because otherwise, the probability of OBI occurrence would be very high and the system would not generally work. With the active splitter architecture, however, OBI cannot occur and the signal to noise margin is much higher than with RFoG. Because of this, a second approach to reducing clipping is to operate ONUs in a continuous "on" state with the active architecture previously described. For 32 ONUs delivering signals into an active splitter, the shot noise and laser noise accumulates, but the signal to noise budget is so high that the resulting SNR performance is still much better relative to existing RFoG systems. As a consequence, the active splitter architecture allows operation of all connected ONUs simultaneously given that the active splitter architecture eliminates OBI.

Figure 4:
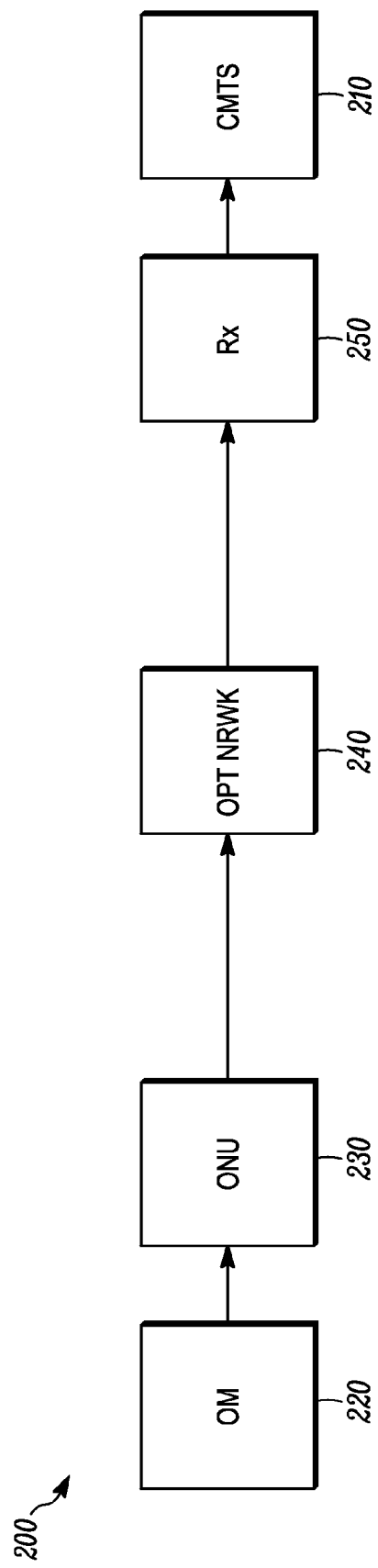
FIG. 4 shows an RFoG transmission path between a CMTS and a cable modem.

A third option to alleviate laser clipping is to allow the ONUs to operate in burst mode, but to detect the amount of power out of the ONU and attenuate the ONU's signal so as to prevent clipping. Referring to FIG. 4, using a traditional RFoG system 200, the CMTS 210 may keep the RF level at a return input port constant. The return signal is generated by a cable modem 220, provided to an ONU 230 that includes an optical reverse transmitter and relayed over an optical network 240 to a receiver 250 co-located with the CMTS that converts the optical signal back to an RF signal and provides that to the CMTS 210. It should be understood that the optical network 240 can contain active and passive elements. It should also be understood that the communication between the cable modem 220 and the CMTS 210 is bidirectional, i.e. there are both "forward" and "reverse" path signals.

The communication path shown in FIG. 4 may be used to adjust the output level of the cable modem 220. In case the loss from the ONU 230 to the receiver 250 is high, or the loss from receiver 250 to the CMTS 210 is high, then the CMTS 210 will adjust the output level of the cable modem 220 to a high level in order to obtain a set input level at the CMTS or a level within a predefined range at the CMTS. In traditional RFoG systems there is considerable margin on the input level that the ONU can handle, to allow for this adjustment. However, it is still possible for the cable modem 220 to overdrive the ONU 230, particularly as the amount of spectrum used by the cable modem increases to support future heavy data loads. When the ONU 230 is over-driven, then the RF signal modulated onto the laser of the ONU 230 becomes so high that the reverse laser in the ONU 230 is driven into clipping, i.e. the output power from the laser swings so low that the laser is turned off. This causes severe signal distortions and creates a wide spectrum of frequencies that interferes with communication throughout that spectrum.

The optical network typically combines signals from multiple ONUs, each ONU is typically communicating in another band of the frequency spectrum. The communication of all these ONUs is affected by the wide spectrum induced by the distortions even if only one ONU is clipping. Preferably this problem is resolved in such a way that the other ONUs are not affected, the clipping ONU is brought to a state where it can still communicate, and the CMTS produces a warning that an ONU is not operating optimally.

A variation on the third option just described is to operate ONUs in burst mode where the ONU switches between a low power state (for instance −6 dBm) and a high power state (for instance 0 dBm). This means that the ONU laser never fully turns off, i.e. the laser always operates above its laser threshold, and can always be monitored by the active splitter. The reduction in output power when it is not transmitting RF signals reduces the shot and laser noise accumulated in the active splitter such that the signal to noise impact is minimized.

In circumstances where the optical combiner unit cycles to a low power state rather than a completely off state, the photodiode current and a max/min can be tracked for photodiode current across all of the ports of the combiner, and thus a microcontroller can be used at the optical combiner to continuously track the max and min in a specified time interval. For example, if for ten minutes the photodiode current max is 0, then the optical combiner determines that the cable modem is either not connected, has a defective optical link, or is otherwise defective. Optionally the active optical combiner can signal absence of photo-current to a head end. The optical combiner is also able to configure itself whether or not the optical combiner can determine if light received is received is bursty, as in normal RFoG operation, or CW (continuous wave) as with a node reverse transmitter. The optical combiner is able to know by using CMTS upstream signaling imposed by the CMTS onto the modems to analyze which ports are working, which ports are silent, which input ports are connected to ONUs, and which input ports are connected to optical combiner reverse transmitters, where optical combiner ports may have an output power profile different from ONUs in the sense that the power may be CW or may be fluctuating between a low and a high power state or may carry information embedded in the signaling indicating the presence of a further optical combiner between the ONU and the optical combiner.

For cascaded active splitters, the return lasers in cascaded active splitters can similarly be operated in conventional burst mode where the laser turns off between bursts, in CW mode, or in a burst mode that switches between a high and a low power state. It should also be understood that CW operation of reverse lasers and/or ONUs, or burst mode operation with a low and a high level further facilitates determination of the optical input levels into the upstream input ports of active splitters. It should also be understood that, although the devices and methods disclosed in the present application that prevent or otherwise reduce clipping by a laser operating in burst mode was described in the context of an ONU, the devices and methods used to prevent clipping by a laser in an ONU are equally applicable to preventing clipping by a laser in an active splitter as previously disclosed.

Figure 5:
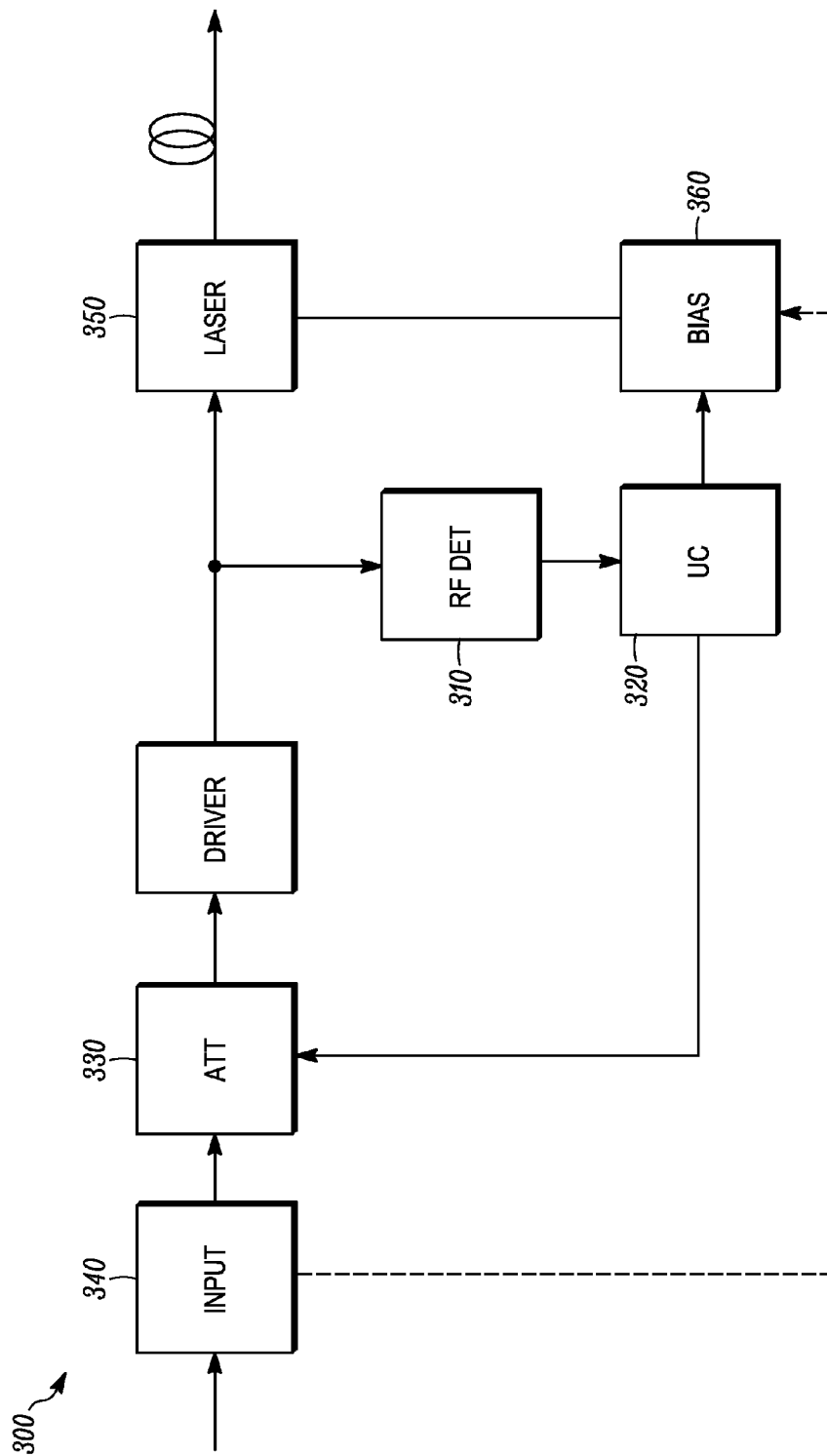
FIG. 5 shows an improved ONU that mitigates clipping.

FIG. 5 shows a system that mitigates laser clipping that might otherwise result from burst mode communications from an ONU. Specifically, an ONU 300 may include an RF rms detector 310, a microcontroller 320 and an algorithm to adjust an attenuator 330 in the ONU as a result of the power detected at the RF rms detector 310. The reverse path from the ONU 300 may be operated in burst mode; when an RF signal is presented to the input 340 then the ONU's laser 350 is turned on by the bias circuit 360. This can be accomplished either by an additional RF detector (not shown in the figure) in the input circuit directly turning on the bias circuit (dashed arrow) or by the RF detector 310 and the microcontroller 320 turning on the bias and setting the bias level. When a burst occurs, the RF detector 310 measures a power level and provides that to the microcontroller 320. The microcontroller also is aware of the operating current of the laser 350 as set by the bias circuit 360. Thus, the microcontroller 320 can compute if the RF signal level is large enough to induce clipping of the reverse laser. If no clipping will occur, no further action needs to be taken and the ONU 300 can retain a nominal RF attenuation value. If, at that time, the ONU is not at a nominal RF attenuation value the procedure is more complicated, this will be discussed later in the specification.

If clipping will occur, the microcontroller 320 stores the event. If a specified number of clipping events has been counted within a specified time interval, then the microcontroller 320 determines that the ONU 300 is having significant performance degradation due to clipping, and is also significantly impairing other ONUs in the system. In that case, the microcontroller 320 computes how much the RF attenuation needs to be increased to eliminate the clipping using RF power measurements that have been previously recorded. The microcontroller 320 then increases the RF attenuation to a new value such that the laser 350 is modulated more strongly than normal (more modulation index than the nominal value), but still below clipping. The microcontroller 320 may optionally also increase the laser bias setting to provide more headroom for laser modulation.

Because attenuation of the signal from the ONU 300 has been increased, the RF level as seen by the CMTS at the end of the link drops. The CMTS will then attempt to instruct the cable modem to increase the output level to restore the desired input level for the CMTS. This may result in either of two scenarios. First, the cable modem may not be able to further increase output level and the CMTS will list the cable modem as a problem unit that is not able to attain the desired input level to the CMTS. This does not mean that the CMTS can no longer receive signals from the cable modem, as the CMTS has a wide input range to accept signals. Hence, the reverse path still generally functions whereas it would have been severely impaired had the clipping problem not been resolved. Second, the cable modem may have more headroom, in which case the CMTS will instruct it to increase its output level and restore the CMTS input level to the desired value. As a consequence, the reverse laser will be driven into clipping again and the ONU microcontroller will further increase the RF attenuation. This cycle will continue until the cable modem has reached its maximum output capability and then the system is back to the first scenario.

The system shown in FIG. 5 provides protection from clipping by ONUs, and also causes the CMTS to be aware of problem modems or ONUs. As was previously noted, the root cause of the problem was that the loss from ONU to CMTS was too large, due for example to a bad fiber connection in the optical network from ONU to the receiver. This problem is signaled, and eventually will be fixed. When the problem is fixed however, the CMTS input level increases beyond the preferred CMTS input level and then the CMTS will direct the cable modem to reduce output level. If the ONU is not at the nominal attenuation value and notices that the actual modulation index is at or below the nominal level then this can be recognized as different from the previous "new value" for ONUs that had been overdriven that was deliberately set above the nominal modulation index. This implies that the problem in the system has been fixed and the microcontroller can reduce the attenuation down to the nominal value, gradually or in one step. Thus, this technique automatically recovers from the state where it protects the ONU from clipping with increased attenuation to nominal attenuation once the system has been fixed.

As previously indicated, an ONU takes time to turn on after a burst has been detected. For example, the RFoG specification indicates that the turn-on time of an ONU should be between 100 ns thru 1000 ns (i.e. 1 µs). A turn-on time that is too fast undesirably creates a very high low frequency noise, which decreases as frequency increases. Unfortunately, because this noise extends to around 50 MHz or beyond, most of the currently deployable upstream signals are propagated within the frequency range that is affected by noise due to an abrupt turn-on time. Exacerbating the signal degradation is the fact that the noise is spiky, in that the instantaneous noise burst could be much higher than what is commonly seen on a spectrum analyzer with moderate video bandwidth.

Figure 6:
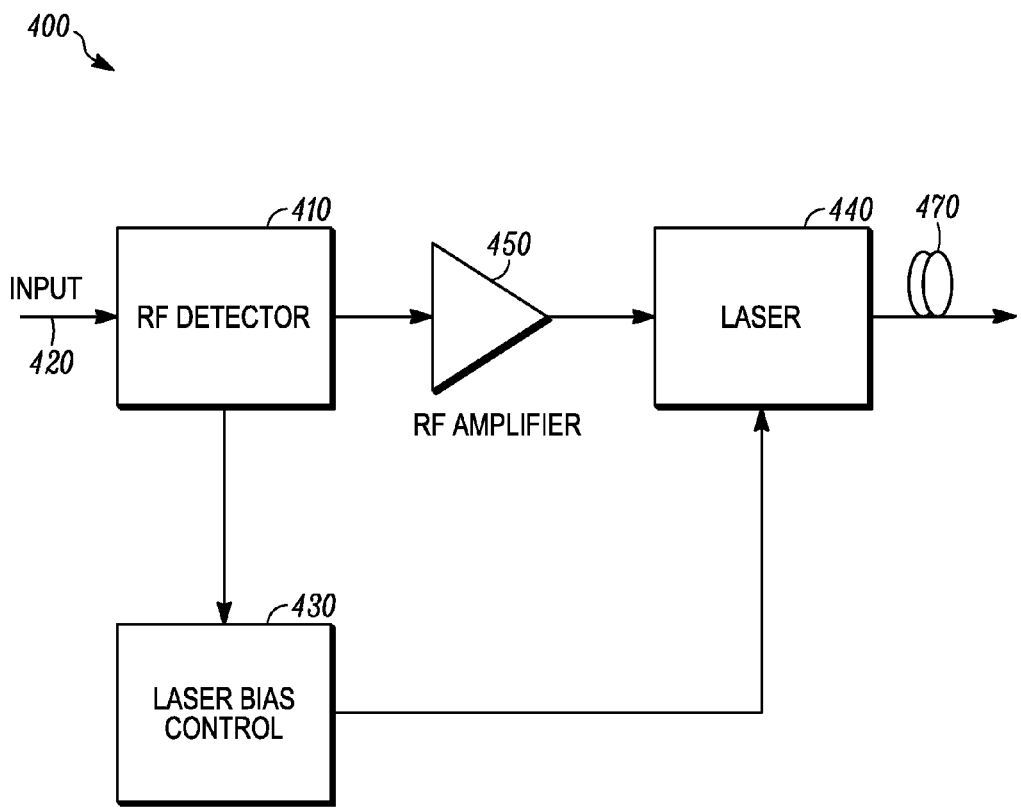
FIG. 6 shows a second improved ONU that mitigates clipping.
Figure 6:
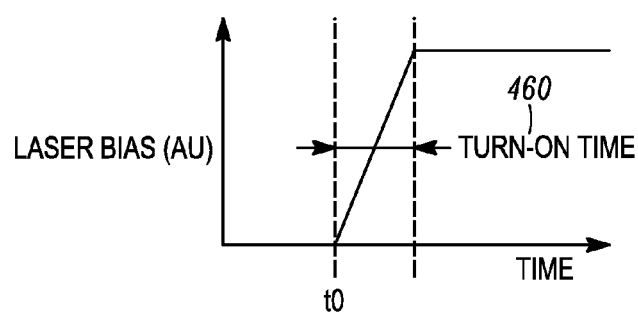

FIG. 6 generally illustrates an ONU upstream architecture 400 where an RF detector 410 detects whether an RF signal is present at its input 420. If a signal is detected, the RF detector 410 passes the signal through to an amplifier 450 and also signals a laser bias control module 430 to turn on at time t0 a laser 440, which has a turn-on time 460. The amplifier 450 amplifies the RF signal that is passed through from the RF detector circuit 410. The amplified signal drives the laser 440. The laser's output is propagated from the ONU on a fiber 470. For simplicity, the downstream ONU receiver architecture is not shown in FIG. 6. The turn-on time 460 of the laser has a profound effect on the spectrum produced by the turn-on event.

Figure 7:
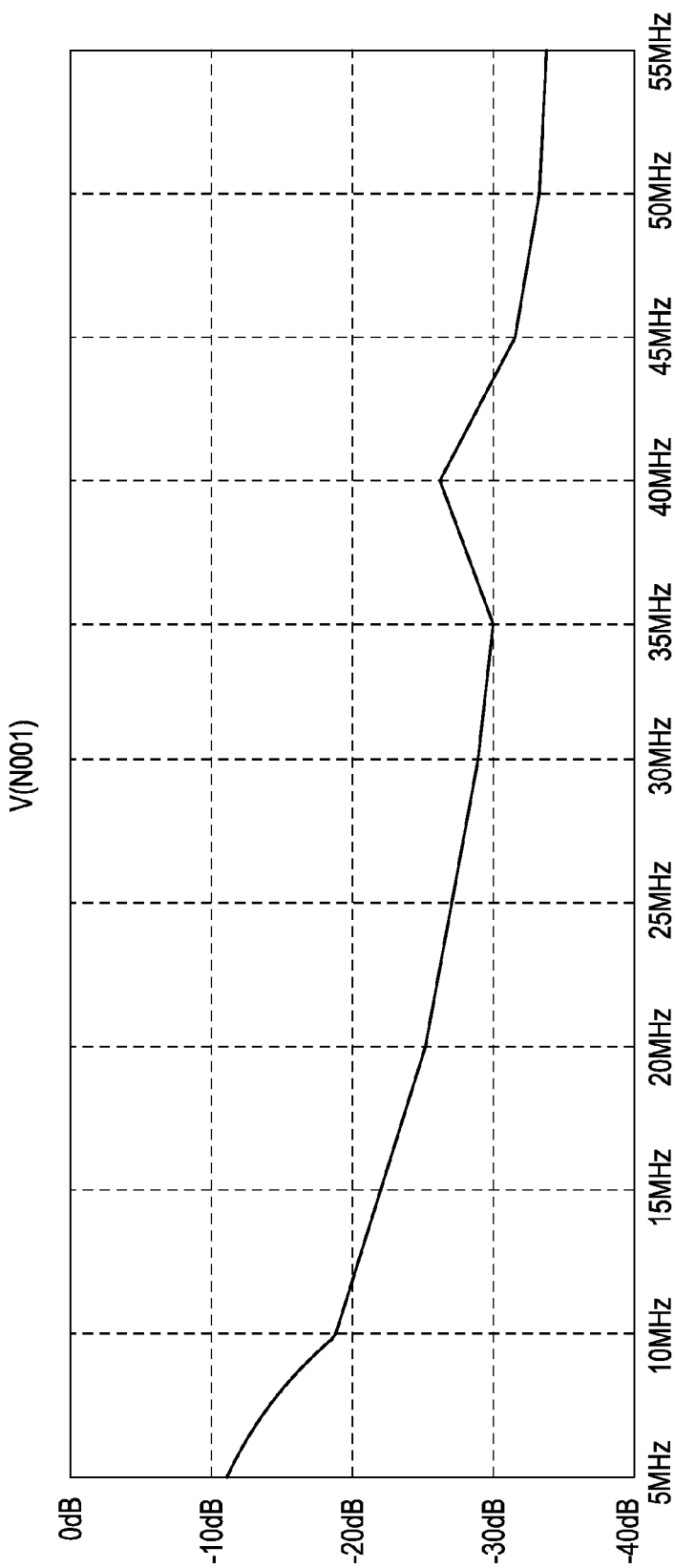
FIG. 7 shows an ONU output spectrum having a rise time of 100 ns.
Figure 8:
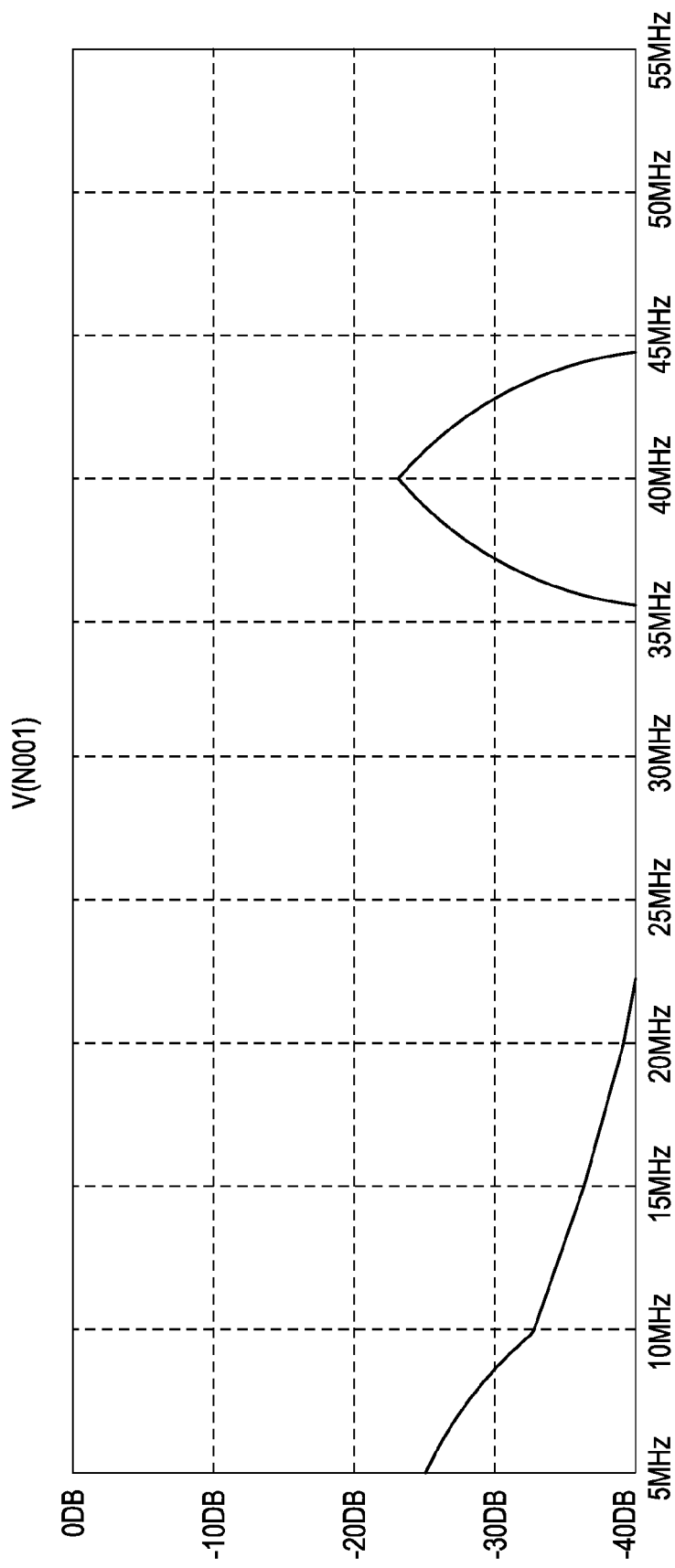
FIG. 8 shows an ONU output spectrum having a rise time of 1000 ns.

FIGS. 7 and 8 show estimated spectra for a rise time of 100 ns and 1 µs, respectively, for a typical signal at 40 MHz. For a short rise time, the noise due to the ONU turn-on is of the same order of magnitude as the intended signal. With a slower laser turn on this effect can be mitigated.

If there is just one ONU on at any given point in time, the effect of low frequency noise due to ONU turn-on is negligible, because the DOCSIS load is inset after the laser has fully turned on. However, when there are multiple ONUs that can turn on at any given time, then the noise is often not negligible. If there was a first ONU on and a second ONU turns on while the first one is transmitting data, then the spikes in high noise, described above, are present across a wide range of the frequency spectrum of the upstream signal while the first ONU is transmitting data. Depending upon the relative RF levels of the signals and the magnitude of the noise spikes, the signal may experience pre- or even post-forward error correction (FEC) errors, when measured at the CMTS for example. The potential for debilitating noise becomes more and more pronounced as the numbers of ONUs that can turn on increases, as is likely to happen as architectures migrate to the DOCSIS 3.1 standard. While this problem has always existed, it only becomes apparent, as a residual error floor, when the OBI and its induced errors are eliminated.

An additional impairment is caused by the application of the RF signal before the laser has fully turned on and has stabilized. Specifically, an impairment can occur for example if the laser turn-on time is slower than the DOCSIS Preamble which may be applied before the laser has reached steady state. Typically, the DOCSIS Preamble is sent as a QPSK signal and can often be 6 to 10 dB higher than the regular RF signal that follows, depending upon signal conditions. In such an instance, the laser will be over-driven while still in a low power state and experience very large clipping events that may cause spikes in noise throughout the RF spectrum of the upstream signal, and thus hide other signals that may exist at the same time. As previously indicated, while this effect has always occurred, it only becomes observable with the elimination of the OBI, and its attendant OBI-induced errors.

Figure 9:
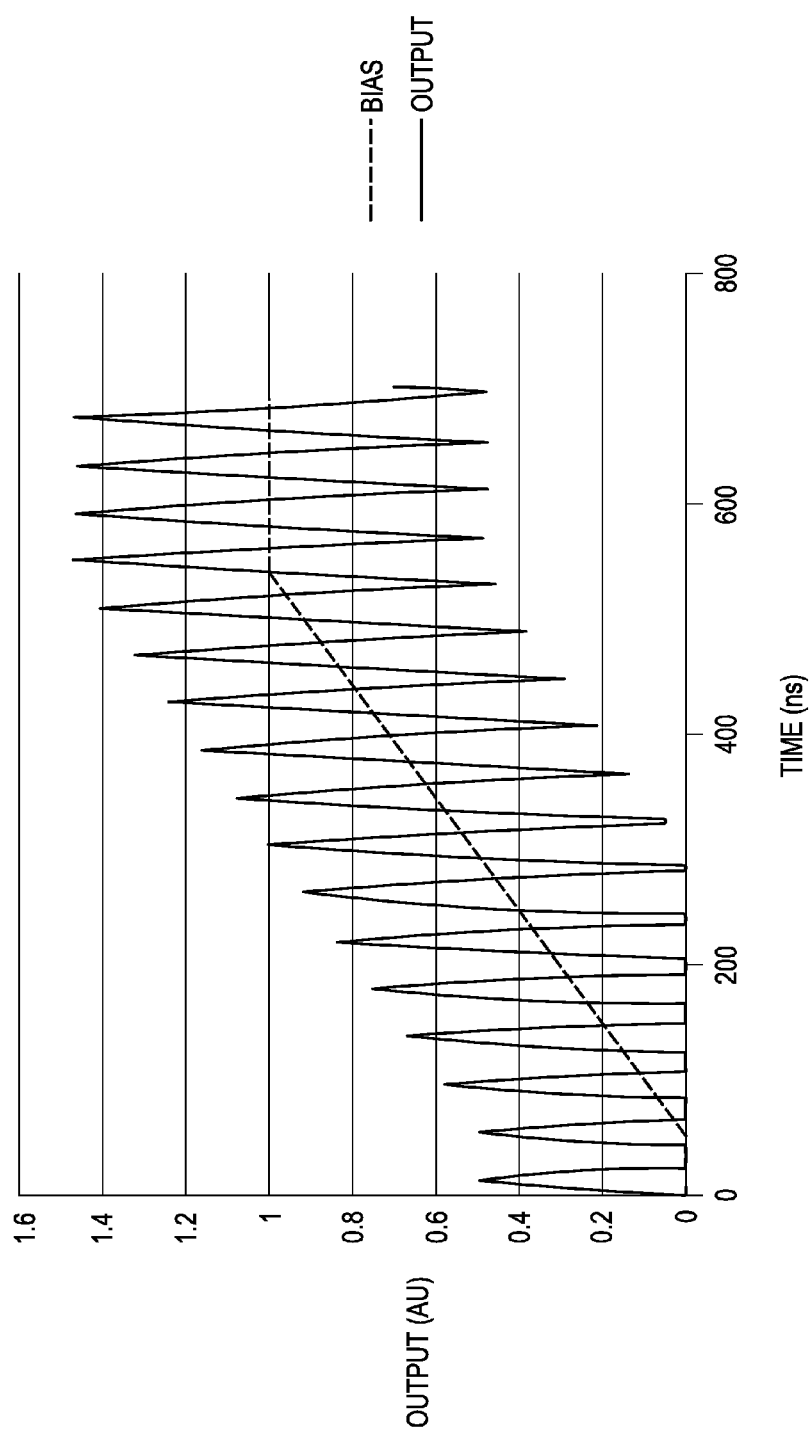
FIG. 9 shows a response time of an ONU to an RF signal.

FIG. 9 shows a bias, around which a laser is modulated with a sine wave signal. During the time that the laser bias is insufficient, the output signal is clipped. For slower laser turn-on, the duration of the clipping is increased. While it may be desirable to reduce the low frequency RF spikes that occur across the upstream frequency spectrum by having a slower turn-on time, the increase in clipping described above may counteract the benefit of the slow turn-on time. Disclosed are novel techniques that permit a slow turn-on time while avoiding clipping artifacts.

Figure 10:
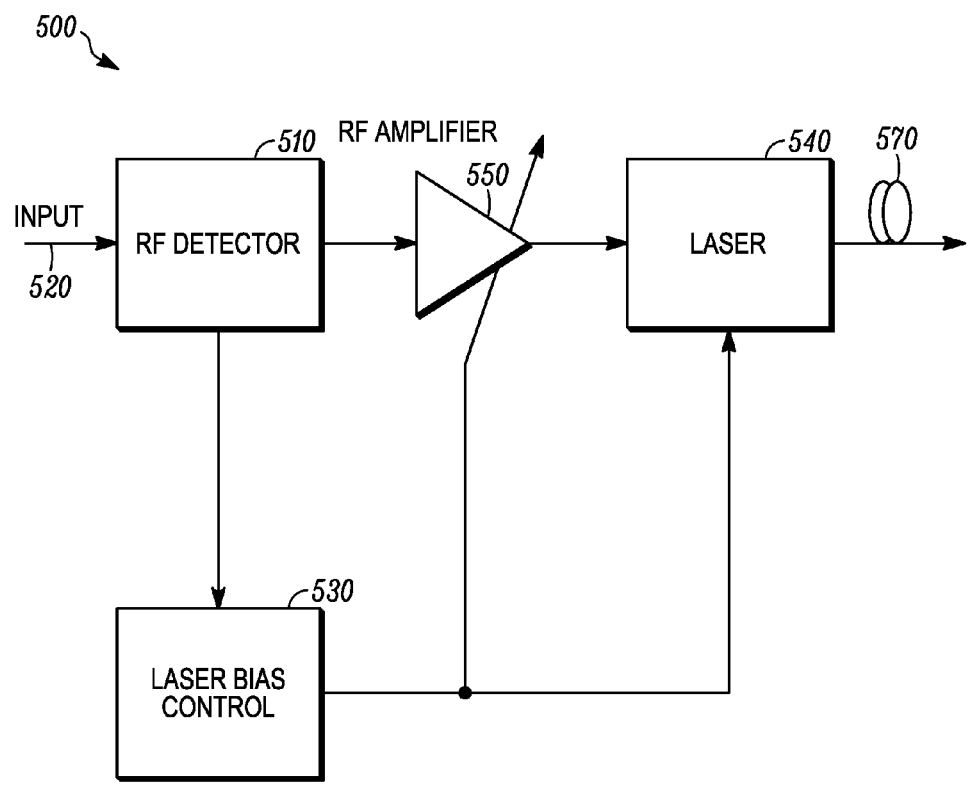
FIG. 10 shows an ONU having a laser bias and RF amplifier gain control.
Figure 10:
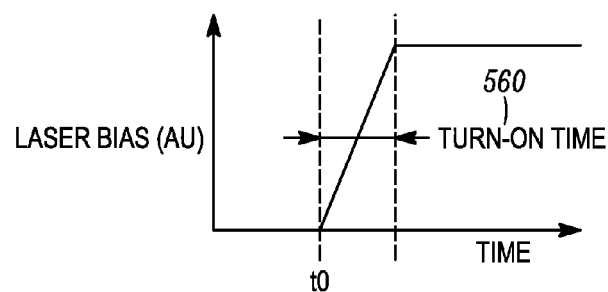

Referring to FIG. 10, a novel ONU upstream architecture 500 includes an RF detector 510 that detects whether an RF signal is present at its input 520. If a signal is detected, the RF detector 510 passes the signal through to an amplifier 550 and also signals a laser bias control module 530 to turn on at time t0 a laser 540, which has a turn-on time 560. The laser bias control module 530 preferably modulates the bias of the laser 540 to achieve a full turn-on of the laser 540 over a turn-on time 560 that is preferably as slow as possible, e.g. the slowest turn-on time allowed by the RFoG standard, or in some embodiments even longer. In some embodiments, the turn-on time of the laser 540 could be up to 500 ns, 1 μs, or longer. This may greatly reduce the low frequency noise. The turn-on time for the laser may be linear, as shown in FIG. 10, or may implement a transition along any other desired curve, such as a polynomial curve, an exponential curve, a logarithmic curve, or any other desired response.

The amplifier 550 amplifies the RF signal that is passed through from the RF detector circuit 510. The amplified signal drives the laser 540. Preferably, when amplifying the RF signal from the RF detector 510, the laser bias control module 530 includes a circuit that modulates the amplifier gain to be proportional to the laser bias. This effectively sets the gain of the amplifier 550 to be proportional to the laser turn-on 560, and thereby reducing or even preventing over shoot and clipping by the laser 540. The laser's output is then propagated from the ONU on a fiber 570.

Figure 11:
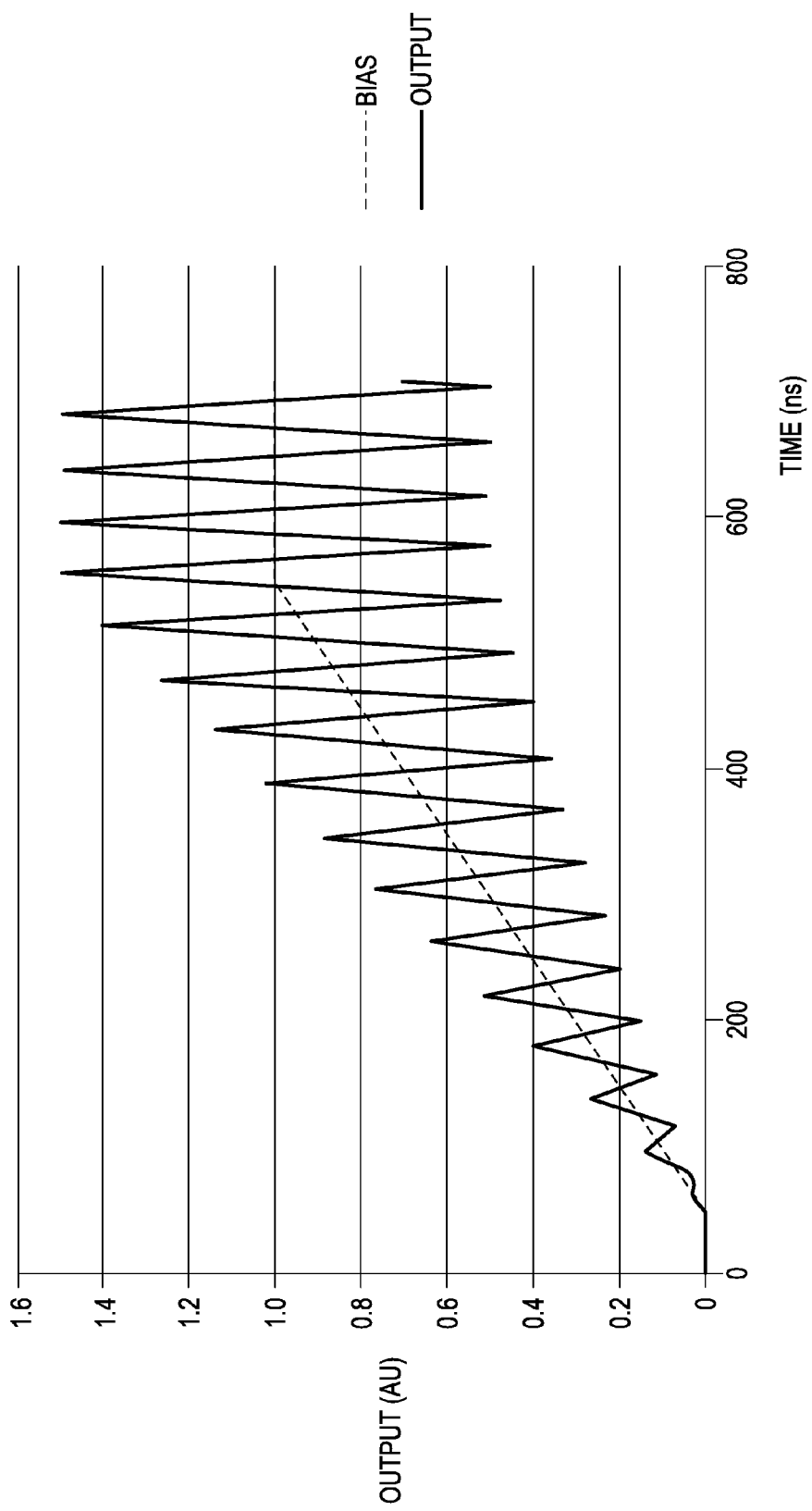
FIG. 11 shows the response time of an ONU with RF gain control in proportion to laser bias control.
Figure 12:
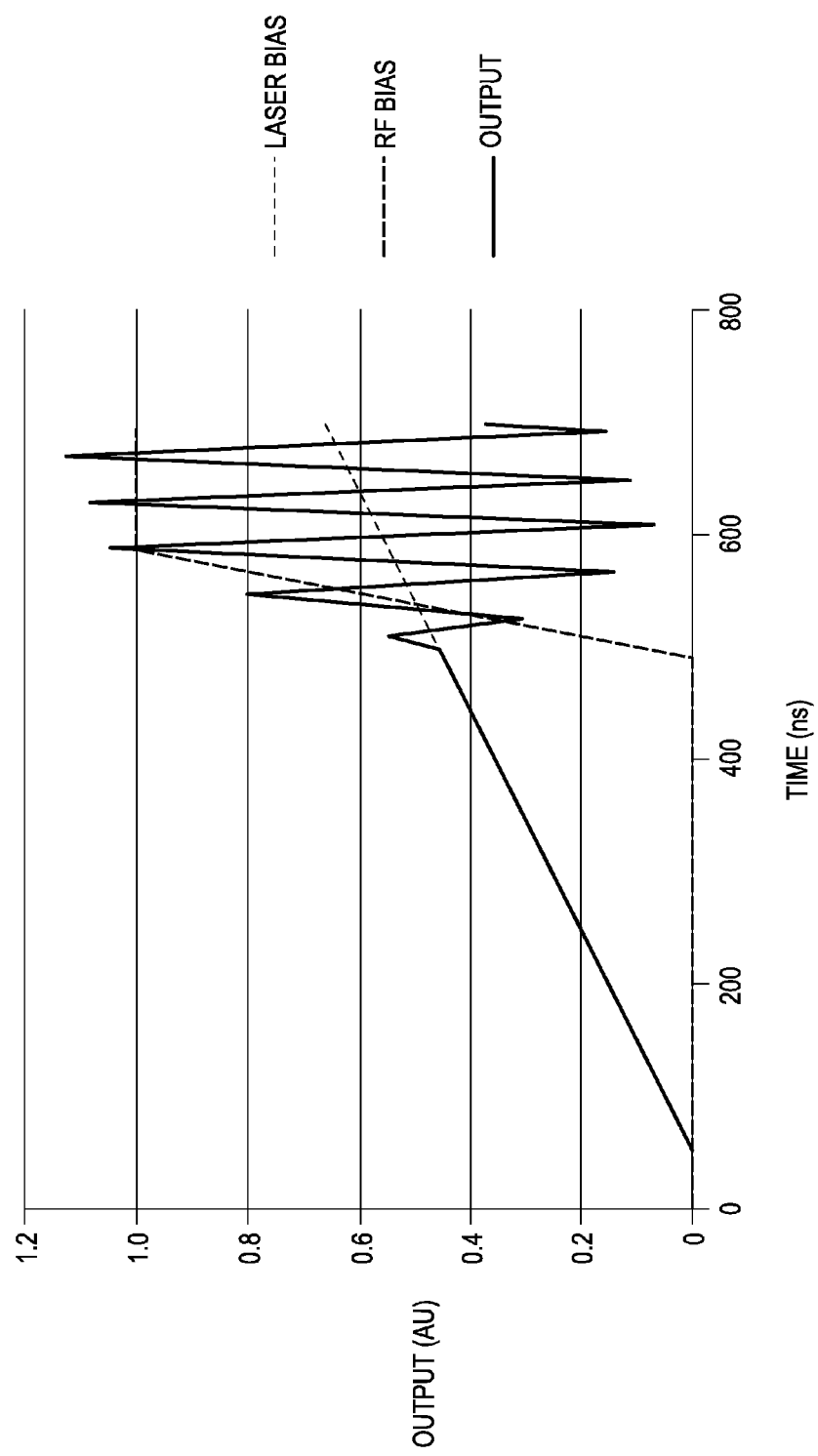
FIG. 12 shows the response time of an ONU where the RF gain control is delayed with respect to the laser bias control.

FIG. 11 shows the output of the laser 540 when using the system of FIG. 10. As seen in this figure, when using an RF gain factor proportional to the laser bias, the clipping no longer occurs. However, the variation in RF level during the laser turn-on may potentially cause an issue in the burst receiver that may expect a near constant RF level during the laser turn-on. To mitigate this, in some embodiments, the amplifier bias may be modulated to delay the RF signal to the laser, relative to the turn-on time of the laser 540, and may also apply a faster time constant than the optical power turn on. This embodiment is illustrated in FIG. 12.

Figure 13:
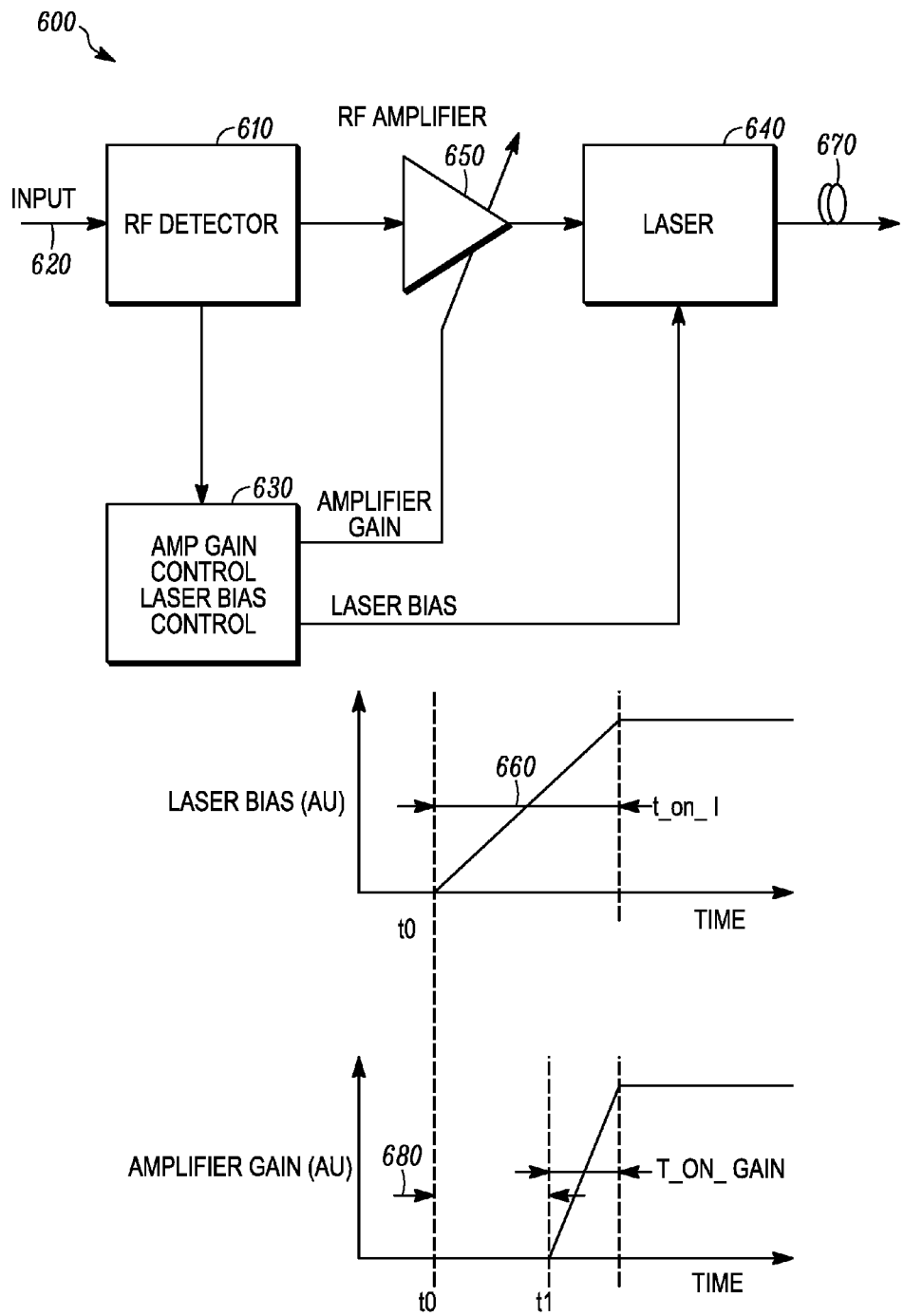
FIG. 13 shows an ONU having a separate amplifier gain and laser bias control.

FIG. 13 shows an implementation of an ONU that includes a delay in the RF signal to the laser, relative to the turn-on time of the laser, and also applies a faster time constant than the optical power turn-on. Specifically, a novel ONU upstream architecture 600 includes an RF detector 610 that detects whether an RF signal is present at its input 620. If a signal is detected, the RF detector 610 passes the signal through to an amplifier 650 and also signals a laser/amplifier bias control module 630 to turn on at time t0 a laser 640, which has a turn-on time 560. The laser/amplifier bias control module 630 preferably modulates the bias of the laser 640 to achieve a full turn-on of the laser 640 over a turn-on time 660 that is preferably as slow as possible, e.g. the slowest turn-on time allowed by the RFoG standard, or in some embodiments even longer. In some embodiments, the turn-on time of the laser 640 could be up to 500 ns, 1 μs, or longer. This may greatly reduce the low frequency noise. The turn-on time for the laser may be linear, as shown in FIG. 13, or may implement a transition along any other desired curve, such as a polynomial curve, an exponential curve, a logarithmic curve, or any other desired response.

The amplifier 650 amplifies the RF signal that is passed through from the RF detector circuit 610. The amplified signal drives the laser 640. Preferably, when amplifying the RF signal from the RF detector 610, the laser/amplifier bias control module 630 includes a circuit that modulates the amplifier gain to be proportional to the laser bias, but with a delay 680 relative to the time $t_0$ that the laser 640 begins to turn on. Preferably, the rise time of the amplifier gain is faster than the rise time of the laser turn-on. In some embodiments, the laser/amplifier bias control module 630 simply switches on the RF gain, i.e. the rise time is as short as the amplifier allows. The laser's output is then propagated from the ONU on a fiber 670.

This ONU shown in FIG. 13 effectively sets the gain of the amplifier 650 to be proportional to the laser turn-on 560, and thereby reducing or even preventing over shoot and clipping by the laser 640, while at the same time mitigating problems caused by a receiver expecting a near-constant RF level during the time that the laser turns on. The ability to simultaneously reduce the laser turn-on time and to provide an RF gain to the laser in proportion to the laser turn-on time, but delayed with respect to the laser turn-on time is a feature that has great potential in all applications, and without loss of generality these techniques may be used for any analog application such as DOCISIS 3.0 or 3.1.

Either (or both) of the architectures shown in FIGS. 10 and 13 may be used together with the architecture shown in FIG. 2 so as to further improve speed and stability of HFC systems. These may further be used together with the long term clipping reduction discussed in the previous disclosure to reduce the effects of both long term and short term clipping in the system.

Burst Detection

As indicated earlier, upstream transmissions typically operate in burst-mode (BM), where ONUs power up a transmitter, e.g. a laser, only during time intervals when information is to be transmitted along the upstream path. A burst-mode system generally provides a lower noise environment and thus enables better SNR, and in the case the transmitter is an optical device, the use of burst-mode tends to reduce Optical Beat Interference (OBI). Thus, in some preferred embodiments of the optical combiner system previously disclosed in this specification, where OBI is to be suppressed, such optical combiners are preferably operated in burst mode.

Also as indicated earlier, RFoG architectures that use burst-mode detect the RF level in the ONU, powering the ONU's laser when an RF signal is detected and powering down the laser when the RF signal is not present. This procedure is referred to as "RF detection." In an optical combiner, the optical light inputs coming from the ONUs are all detected and the detector outputs are collected. If RF detection is used with an optical combiner, an RF comparator would be applied to the output of the combined RF output. If the RF level output of the combined RF detectors were higher than the applied comparator, then the optical laser in the optical combiner would be activated.

However, such detection may be fraught with difficulties because the RF level input could be very small. For instance, a very small slice of a D3.1 signal could be produced by any single ONU, hence the modulation index of the ONU would be low, resulting in a low RF level at the optical combiner. Also, optical input power to the optical combiner from a given ONU could be low; with an optical input range spanning up to 12 dB, the RF level after detection could vary by 24 dB. As a result, the RF level from a photodiode could still be so low that the RF level that is to be detected would be lower than the comparator, even if the RF level were high relative to the Optical Modulation Index of the ONU laser that generated the RF signal. In ONU embodiments, the RF level could be turned on after the optical output is turned on, or while the optical output is being turned on, such that the detection of an RF level at the disclosed optical combiner would be delayed. Furthermore the detection could also be slow, because it depends upon the comparator circuit.

An alternative to using burst detection on the cascaded optical combiner units disclosed in the present application would be to keep the upstream light transmission on all the time, irrespective of whether signals are provided to the optical combiner or not, i.e. an "always on optical combiner". Though this would ensure that the optical combiner transparently relays information upstream, it would result in a constant light input at all the ports at an upstream optical combiner device or multiple port receiver. The total light input at the ports thus could lead to a summation of shot noise from all the ports, degrading the SNR performance of the total system. For this reason, in preferred embodiments, the optical combiner unit transmits upstream light only when an RF signal has been received and is to be sent out.

Disclosed herein is a novel method of burst detection that is fast, simple, stable and robust thus enabling multiple new architectures. Specifically, broadly stated, the disclosed optical combiner system may monitor the optical current of each photo diode as well as the sum current of all photodiodes. If any one of the photo diodes registers a photo current, or alternatively a current above a certain minimum value, the retransmitting laser is automatically turned on. The photodiode current generation is instantaneous and beneficially is a DC value that is easier to compare. As speeds of the interconnecting networks increase over time, such optical detection circuits will become more useful.

Such an Optical Burst Mode (OBM) detector promotes reliability and may have the following advantages: (1) in the case of multiple daisy chained optical combiners as disclosed in the present application, substantial reduction in the additive shot noise is achieved relative to an "always on" solution; (2) in the case of DOCSIS 3.1 transmission, individual signal transmissions with very low RF levels per ONU may be detected and retransmitted; and (3) in the case of varying optical input levels due to different optical lengths between the ONUs and the disclosed active optical combiner, or varying optical lengths between multiple daisy chained such active optical combiners, reliable burst mode operation may still be achieved.

Furthermore, the disclosed novel burst detection also enables detection of light at the input immediately at the start of a burst at the optical combiner input. Conversely, where there is no light at the input, or alternatively no light for a certain period of time, the ancillary RF amplifiers in the disclosed active optical combiner may be powered down, thus reducing the power dissipation of the disclosed active optical combiner. When light appears at the input of the disclosed active optical combiner, the amplifiers can be powered on again within the time allowed; for instance in an RFoG system up to one microsecond is allowed to establish an optical link from the moment that the RF input is detected and the system has started to turn on. Because RF amplifiers take a finite time to turn on and establish amplification; early detection of a burst is important to provide enough time to establish normal operation. Such power cycling could reduce power dissipation by as much as ten times, thus drastically improving the critical infrastructure metrics. Thus, for example in the event of a power outage, the optical combiner can conserve the power required by not only using optical burst operation, but also circuitry for RF burst operation, and extend a battery's life, if available.

Implementation of an optical power detection circuit capable of covering a wide range of optical input power, in an architecture having multiple detectors is not trivial. Given the large number of detectors present, combined with a wide optical input power range, the amount and range of photocurrent that needs to be reliably detected is considerable. Simply measuring the voltage drop across a resistor in the detector bias network is difficult; at low input power on a single detector, a small voltage drop can be reliably detected only if the value of a resistor, across which is a voltage drop equal to the photodetector bias, is relatively high. However, increasing the value of such a resistor is not desirable because this leads to an increased voltage drop when high detector currents are present at multiple detectors; the detector bias would become a strong function of the optical light present at the detectors. In some embodiments, the detector bias is held constant because detector responsivity depends on detector bias; thus a varying the detector bias could lead to a variation in the gain of the system. Even a resistance value as low as a typical transmission line impedance, such as 75 Ohms, can be problematic when a large number of detectors are active, and for instance 100 mA of detector current flows in the multiple detector system, leading to an excessive drop in detector bias.

Disclosed is a method to detect optical light over a wide input power range while retaining a constant bias on the detectors present in the transmission line receiver. In order to accomplish this, a combination of both an RF amplifier and a trans-impedance amplifier are used with the multiple detector structure. In some embodiments, the trans-impedance amplifier is connected to a high-pass structure in front of the RF amplifier such that for low frequencies the trans-impedance amplifier has a very low impedance connection (less than the transmission line impedance) to the detector bias.

Referring to FIG. 14, which shows an example of a transmission line receiver structure 700, a photo-detector may be accurately modeled up to fairly high frequencies (~1 GHz) by a capacitance in parallel with a current source for reasonable input power levels (>1 uW). Thus, in this figure, each of the circuit elements 710 would be a model of a photodetector. Conventional receiver designs use a trans-impedance amplifier or match the detector to as high an impedance as possible, such as 300 Ohm, so as to convert the current source signal to an RF signal with the best possible noise performance. These approaches are limited by the detector capacitance such that an increase in the number of detectors by simply combining detectors or detector area leads to a loss of detector performance due to an increase in combined detector capacitance, and therefore a large number of detectors (e.g. 32) cannot reasonably be expected to work well with a single RF amplifier. This implies that multiple amplifiers are needed to receive a large number of fibers.

As an alternative. multiple detectors could be provided to an RF combiner before being amplified. An RF combiner requires that each detector be terminated individually with an RF impedance that is typically less than 100 Ohm, which will consume half of the detector current and, due to combining signals from multiple detectors, the RF combiner will introduce an additional loss of at least 10*log(N) dB, where N is the number of detectors combined. This loss becomes excessive for 8 detectors or more. Further, other losses are caused by practical implementations of RF combiners that require expensive transformers in their realization. The transformers also cause bandwidth limitations and aforementioned other losses, and are difficult to implement for high impedances (such as greater than 100 Ohm).

In the disclosed transmission line receiver, use is made of the insight that a reverse biased photo-detector behaves as a current source in parallel with a capacitor with a low loss at RF frequencies. This transmission line receiver will not induce the 10*log(N) loss of the RF combiner, not require transformers, offer a high bandwidth and be able to provide an output signal representative of a delayed sum of a large number of detectors. A transmission line with impedance Z can be modeled by a ladder network of inductors and capacitors with $L/C=Z^2$, which works well for frequencies under the resonance frequency of L and C. Practical detector capacitance values are on the order of 0.6 pF, such that a 75 Ohm transmission line would require L=3.4 nH. The resonance frequency is well over 1 GHz such that, for up to 1 GHz, a transmission line with an arbitrary number of detectors compensated with 3.4 nH inductors would simulate a 75 Ohm transmission line. The quality of the parasitic capacitance of the reverse biased detectors is such that they can be considered low loss capacitors at RF frequencies. The 3.4 nH can also be distributed around the detectors as 2×1.7 nH, leading to a design as shown in FIG. 14.

As indicated above, each current source/capacitor combination 710 represents a detector. FIG. 14 shows a number of these in series, separated by respective transmission line sections 720 (100 psec or on the order of 1 cm on board) having 75 Ohm impedance. The detectors are matched with 1.7 nH inductors 730. A 75 Ohm resistor 740 terminates the input of the transmission line. The output 750 of the transmission line feeds a low noise 75 Ohm RF amplifier (not shown). It should be understood that, although FIG. 14 shows six detectors, there is no limit on the number of detectors that can be combined by concatenating these sections, and up to the LC resonance frequency there is negligible impact on the attainable bandwidth for a large number of detectors. In practice the 1.7 nH inductors could be implemented in the PCB layout as narrower line sections, and a balanced transmission line with 100 Ohm or 150 Ohm differential impedance may be used to slightly improve noise figure.

As shown in FIG. 14, each current source/capacitor combination 710 represents a photo detector, where the current source is the detected current in the detector; and the capacitor represents the parasitic capacitance of the detector. Multiple detectors are connected with sections of transmission line (such as T2) and matching inductors (such as L1 and L2). The matching inductors are chosen such that the parasitic capacitance of the photo detectors is matched to the transmission line impedance (typically 75 Ohm). Thus, multiple detectors can be connected and concatenated to a transmission line, such that the detector currents are provided to the transmission line and these detector currents are equally divided to propagate both to the output 750 and to the termination resistor 740 at the other end of the transmission line structure. Each detector current generally passes through transmission line sections, matching inductors, and detector terminals before reaching an end of the transmission line. Thus, signals from adjacent detectors affect the signal voltages present at each detector terminal and could therefore affect the detector current itself, causing a cross-modulation of detector signals. However, because a detector at reverse bias can be modeled as a good current source, such a cross-modulation does not occur. Each detector current half is thus presented at the output of the transmission line as a signal with a delay proportional to the distance of the detector to the output of the transmission line. This distance determines the delay of an electrical signal at the terminal of the detector to the output of the transmission line and includes delay due to matching inductors and photo-detector capacitance. The signal at the output of the transmission line is therefore proportional to the sum of the delayed detector current halves, independent of the number of detectors in the transmission line structure. The signal at the output of the transmission line can thus be said to represent the sum of the delayed detector currents.

The transmission line structure bandwidth is limited only by the inductive matching of the photo-diode capacitance and can be very large, exceeding 1 GHz. The output 750 is connected to an RF amplifier matched to the transmission line impedance, which amplifies the signals output from the transmission line structure. Note that use of a trans-impedance amplifier that is not matched to the transmission line structure would cause a very large reflection of the output signals back into the transmission line structure; a trans-impedance amplifier is not a preferable means to amplify the output from a transmission line receiver.

Figure 15:
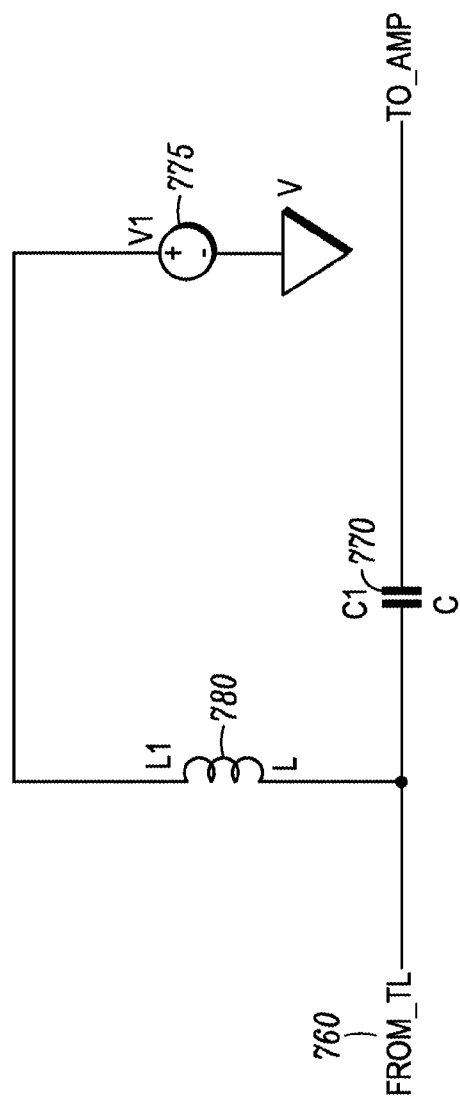
FIG. 15 shows a transmission line receiver connection to a biased amplifier.

Typically the photo detectors need to be biased, for instance with 5 V. In order to decouple the bias voltage from the amplifier, a decoupling capacitor may typically be used. The bias can then be provided via an inductor in a bias-tee arrangement as shown in FIG. 15, for example. The signal from the transmission line 760 is provided to an amplifier (not shown) via a capacitor (770) that passes high frequency signals, and bias from a voltage source 775 is provided to the transmission line via an inductor 780 that passes low frequency signals. The termination resistor 740 at the other end of the transmission line is thus capacitively decoupled to permit a DC bias. The current through voltage source 775 can be measured to determine photocurrent; the voltage source 775 could be constructed as a trans-impedance amplifier providing a constant voltage and an output proportional to the current provided. However, in implementations, the inductor 780 needs to be chosen with a value large enough that it does not affect the low frequency response of the amplifier. As a consequence, there may be a delay in the response of the current in the inductor 780 to a change in photo detector current, and this tends to cause a delay in the detection of photocurrent.

Figure 16:
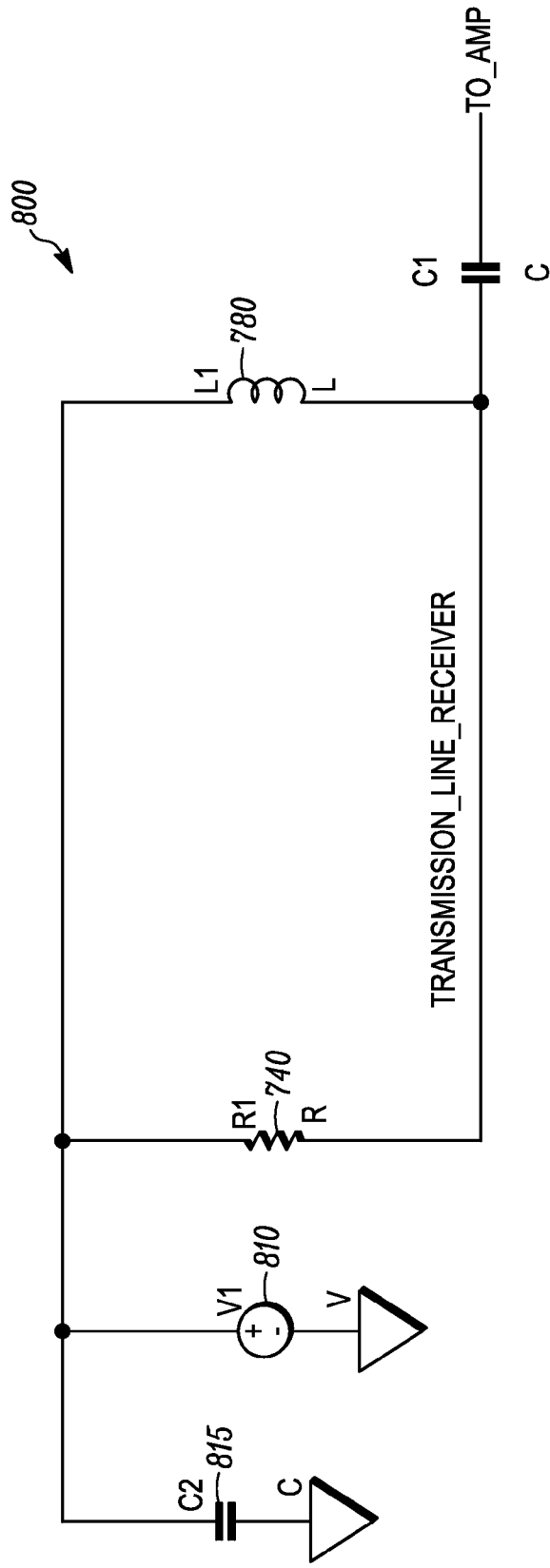
FIG. 16 shows a transmission line receiver with photocurrent detection at the termination side.

FIG. 16 shows an implementation 800 that uses both ends of the transmission line receiver structure to alleviate such a delay. The resistor R1 in FIG. 16 is the termination resistor 740 shown in FIG. 14, and the inductor L1 is the inductor 780 in FIG. 15. The voltage source 810 provides bias both to the termination resistor 740 and the inductor 780. The current in resistor 740 responds instantly to a photocurrent such that a fast detection of photocurrent is enabled. The inductor 780 can support large photocurrents without a significant voltage drop such that large photo currents can be supported without a significant drop in bias to the photo detectors. A capacitance 815 can be placed adjacent to the voltage source 810; for an ideal voltage source it may not carry any current because the voltage is constant. However at RF frequencies it can be difficult to realize a perfect voltage source, hence the capacitor 815 provides a low impedance to ground such that RF currents in the termination resistor 740 do not cause modulation of the voltage at the voltage source 810.

In order to realize an efficient detection circuit for the current in voltage source 810, the voltage source 810 is preferably implemented as a trans-impedance amplifier. A trans-impedance amplifier is a basic electronic circuit that holds a node between two current paths at a constant voltage and has an output that changes its output voltage in proportion to the current provided at that node. Thus, externally the trans-impedance amplifier looks like a voltage source to that node, but there is an additional output that represents the current provided. This output may then be used to drive a decision circuit to decide if a photo-current flows or not. Due to the fact that the trans-impedance amplifier is realized with a practical transistor circuit, it does not have infinite bandwidth, which means that it is not able to hold the node voltage constant for very high frequencies and for that reason the capacitor 815 may be added in some embodiments.

It should be understood that in some embodiments, the LC bias network prior to the amplifier (capacitor 770 and inductor 780) may be replaced by more complex circuits, or even with diplex filters—provided that the network provides a low-loss, high-frequency path from the transmission line detector to the amplifier, and a low-loss (low impedance) path at low frequency from the voltage source (trans-impedance amplifier) to the transmission line detector bias. It should also be noted that the trans-impedance amplifier may be implemented such that the output voltage first changes linearly as a function of photo-current, but then saturates at a photo-current that is sufficiently high.

In other implementations, a photocurrent detection circuit may be applied to each individual photo detector; optionally one electrode of a photo detector (for instance cathode) may be connected to an RF circuit and the other electrode (for instance anode) may be connected to an optical power detection circuit. This increases complexity, as a detection circuit is required per detector. Also, some embodiments may optionally use a trans-impedance amplifier per detector.

Figure 17:
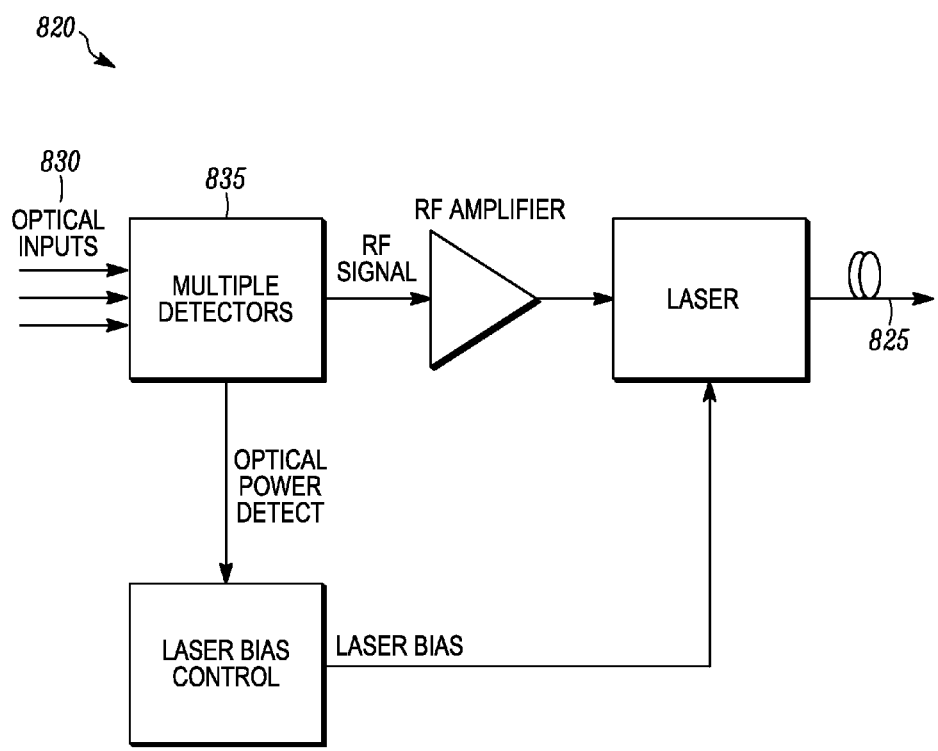
FIG. 17 shows an active combiner with multiple inputs and optical burst mode operation.
Figure 17:
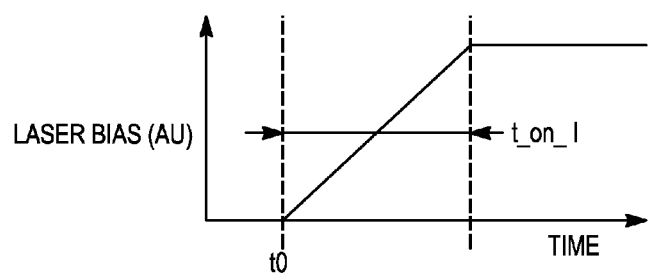

With an optical burst mode detection circuit, for instance of the type described above, the bias of a laser or the bias or gain of an amplifier may be controlled. FIG. 17 shows a multiple-detector receiver 820 that produces an output 825 signaling that power has been detected from any one of multiple inputs 830. This detection can be based on a detection method as described in the previous section or on multiple detector circuits that are monitoring individual detectors 835. When optical input has been detected at time t0 then the laser bias is turned on with a controlled rise time t_on_1 and the active combiner can re-transmit signals present at the inputs.

Figure 18:
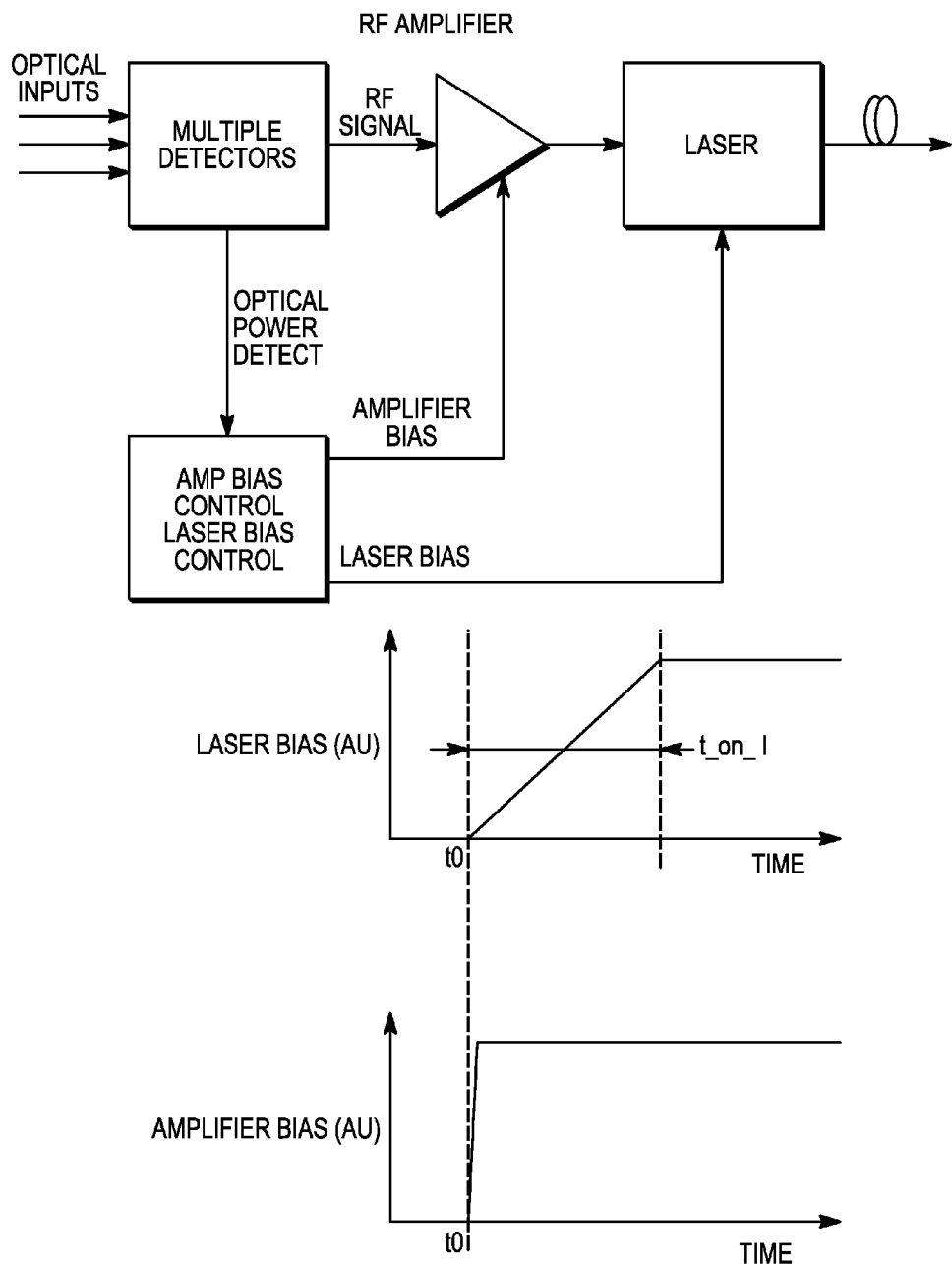
FIG. 18 shows an active combiner with optical burst mode operation including amplifier bias control.
Figure 19:
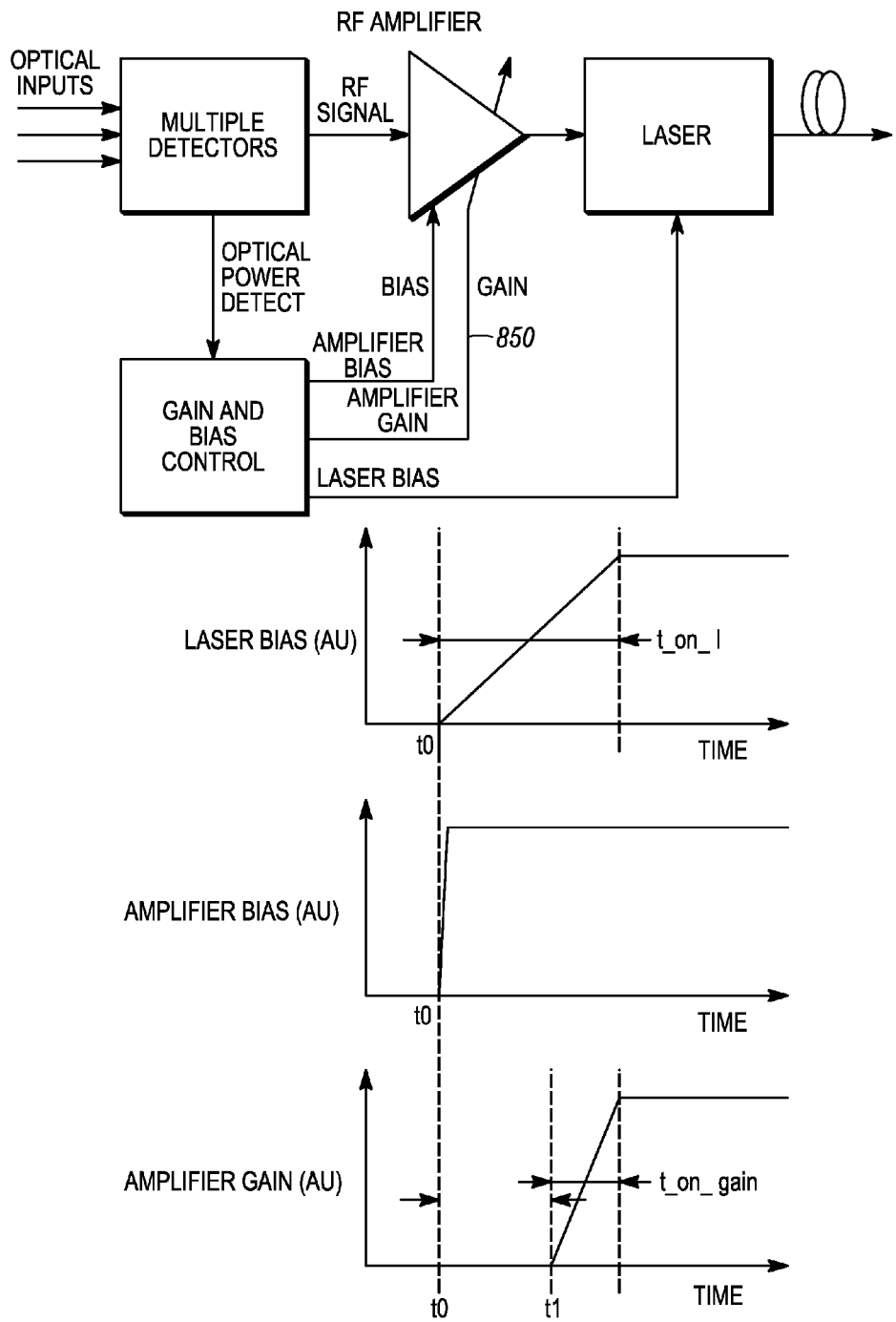
FIG. 19 shows an active combiner with OBM, laser bias, amplifier bias and gain control.

The optical burst mode detection can further be used to control the amplifier bias as shown in FIG. 18; when optical power is detected at t0 the amplifiers are immediately turned on. The laser turns on more slowly such that the amplifiers are settled by the time that the optical power is on. Optionally this scheme may be expanded by a third control signal 850 that controls the amplifier gain, as shown in FIG. 19.

Optical Modulation Index and Self Calibration

For implementations that permit operation of all upstream inputs of the active splitter simultaneously, the total amount of photocurrent on the detectors following the upstream inputs can be high. The impedance of the bias circuit and, as discussed, of the aforementioned filtering means in the detector output path must be low.

In an existing RFoG system, the CMTS controls the output level of the cable modems' communications with ONUs that are transmitting RF signals to a head end such that a desired input level to the CMTS is obtained. This implies that the output level from a receiver preceding the CMTS is adjusted to a known level. If this receiver is of a type that has a known amount of gain such that an output level corresponds to a known optical modulation index, then this implies that the optical modulation index of channels provided to the CMTS is known—given the RF signal level to which the CMTS adjusts the channel. This requires a calibrated receiver that adjusts its gain as a function of the optical input level (2 dB gain increase for every dB reduction in optical input level) such that this fixed relation between RF output level and optical input level is maintained. The modulation index into the receiver is the modulation index of the upstream laser in the active splitter connected to that receiver; thus the CMTS implicitly controls the modulation index of that active splitter output.

The gain of the active splitter should preferably be set such that an output modulation index from that active splitter has a known relation to an input modulation index at one or more of the photo detectors receiving upstream signals from active splitters or ONUs further downstream. This requires knowledge of the photocurrents at these photo detectors, and preferably the active splitter can monitor the photo current of each upstream link by using one detector per upstream link as in a transmission line detector, for instance. Since some systems may operate in burst mode, these photo currents are not always available. However, in a DOCSIS system all ONUs are polled repeatedly to obtain an acknowledgement signal with an interval up to five minutes. This implies that upstream active splitters are re-transmitting the information, and all active splitters in such a system have each one of the upstream inputs active at least once every five minutes. The active splitter can thus record the burst levels and build a map of optical input levels to input ports. Using this information, the active splitter can set an internal gain level such that the upstream modulation index is maximized, but will not clip so long as the input signals to the active splitter are not clipping. Whereas the fiber length from head end to first active splitter is generally long, those fiber lengths between active splitters and those fiber lengths from active splitters to ONUs are generally short, and have small enough loss that the optical input power values to the different upstream input ports are close, and the optimal gain setting is similar for all ports. As a consequence, the optimal gain setting in the active splitter is almost the same for all input ports and the compromise in SNR from assuming a worst case reverse laser modulation index from a signal on any of the input ports is small.

As noted earlier, one embodiment could use the high and low optical output power setting for the reverse laser, instead of switching the laser between a high output power for burst transmission and an off state in between. Not only does this embodiment provide continuous information to active splitters about the link loss to the ONU, it also improves laser operation. When a laser powers on, the transient leads to a brief transition where laser distortion is high and RF input signals can be clipped. If a laser is held at a low power level instead of being in the off state before being turned on to a higher power level, then this transient is near absent and distortions and clipping are reduced. In case the laser is held at a high output power continuously, these transients and distortions are absent. The active splitter architecture permits operating the ONUs in any of these three modes and an optimum can be selected for system operation.

Whereas the upstream input power levels to detectors on an active splitter are typically similar, in some instances they may differ due to differences in connector loss or fiber loss. Preferably, all optical inputs would have the same level or have the same RF level following the detector for an equivalent channel load. Since the active splitter can monitor the power level at each detector and map those optical input levels, it can compute adjustments to optical input power level or in modulation index of those inputs that would be required to equalize the RF levels following the detectors of each input. The active splitter can communicate those preferred settings for output power level or gain for the reverse transmitters downstream that are connected to the inputs. The communication signals can be modulated onto a laser injected into the downstream signals or onto pump laser currents in EDFAs amplifying downstream signals. The modulation can be selected to be small enough, and in such a frequency band, that the communication signals do not interfere with the downstream payload.

Preferably, not only active splitters receive and interpret these communication signals, but also downstream ONU units receive and interpret the signals. This would permit essentially perfect alignment of the optical transmission level and RF gain of all units in an active splitter system. Given the presence of an upstream laser, and the ability of all components in an active splitter system to receive an upstream signal, all components in an active splitter system are capable of upstream communication with the addition of a simple tone modulation or other scheme. Thus, bidirectional communication is enabled, and active splitters and the head end can communicate with each other, self-discover the system, and setup optimal gain and optical levels.

One objective of the active splitter architecture is to provide accurate RF levels to the CMTS that represent an optical modulation index. Doing so is not trivial, and requires a specific self-calibration procedure (later described) that is expected to result in accurate modulation index correlation to active splitter head end receiver output RF levels. The receiver is either a CMTS plug-in or is connected directly to the CMTS without unknown RF loss contributions in between (in case a tap is needed for other services than the CMTS, the tap can be integrated in the receiver to avoid external RF losses). As a consequence, the modulation index of the active splitter re-transmitter units is set precisely.

In case bidirectional communication is not available then the ONU output power level cannot be adjusted by the active splitter and the modulation index of the ONU will still have some uncertainty since the optical loss between ONU and the active splitter/receiver can vary; a +/−1 dB loss variation from ONU to active splitter would result in a +/−2 dB tolerance in RF level, thus a dynamic window will at least have to accommodate that variance and headroom for other tolerances and CMTS setup accuracy. This should be readily available for bandwidths up to 200 MHz such that even without the active splitter controlling the ONU's output power, acceptable system performance can be obtained. With the aforementioned bidirectional control additional system headroom can be achieved.

When 1200 MHz return bandwidth is used, such that ONUs are assigned 200 MHz widths of spectrum, the ONUs can all be operated a few dB below their clip point, i.e. just enough to cover the uncertainty in the loss from the ONU to the active splitter to avoid clipping of the ONUs. This optimizes the performance of the critical link from the ONU to the active splitter, so that 0 dBm ONUs are sufficient. In this type of operation, an arbitrary choice can be made for the number of ONUs operating with such a 200 MHz band, for instance up to six ONUs. This in turn would cause clipping in the active splitter transmitter; thus for 1200 MHz operation, the gain of the active splitter receivers following the ONUs can be reduced by 8 dB such that when six ONUs are transmitting 200 MHz of signal bandwidth, the active splitter reverse transmitter is operated just below clipping. This method of operation maximizes SNR and eliminates uncertainty—the impact of variance in the link between the ONU to the active splitter is minimized, and the active splitter links are operated with a precise modulation index as with lower bandwidth RF return systems. The required dynamic window is reduced to tolerances in CMTS level setting and active splitter output level calibration, permitting operation at an optimal modulation index.

Analysis of the attainable SNR using the system just described, for 1200 MHz operation with a maximum load of 200 MHz per ONU, results in a 5 dB improvement in the SNR attainable at 1200 MHz. This results in about 20% more throughput capacity in the system. With 1200 MHz of bandwidth, the total upstream data rate could be as high as 10 Gbs.

In case the system is initially set up so that the active splitter units expect a 1200 MHz return spectrum (instead of for instance 200 MHz) with a maximum of 200 MHz per ONU, then a penalty of around 7 dB occurs in terms of peak NPR performance. Therefore, the mode of operation preferably can be switched between normal operation, where a single ONU can occupy the entire spectrum, and high bandwidth operation where a single ONU can be assigned a limited amount of spectrum at any time and the active splitter reverse transmitters support the entire spectrum at once.

The proposed architecture has multiple re-transmission links that are preferably operated at the best possible modulation index on the assumption of perfect alignment of the NPR (Noise Power Ratio) curves of those links. As noted earlier, the alignment of the re-transmission in the active splitter return links is critical to obtain the best possible performance (every dB of mis-alignment directly results in a reduction of available SNR) hence a calibration technique is needed to set and hold the correct alignment of transmitter gain factors.

In order to provide such calibration, the active splitter return transmitter gain will be set accurately, such that for a given detector current of the active splitter receiver diodes, the modulation index of the transmitter is equal to the modulation index input to the detector. This only requires knowledge of the detector current; the actual optical input power to the detector and the detector responsivity are irrelevant. In order to accomplish this, means are implemented at each detector to measure detector current such that an appropriate gain can be set for the return transmitter.

The gain may be set individually for each detector, but since multiple detectors can be receiving signals at the same time, this would require a controllable attenuator for every detector (32 detectors are in a typical active splitter unit). Preferably, a single attenuator is used for all detectors. This is achieved using variable output transmitters in the active splitter units, communicating to an upstream active splitter or variable output transmitters in ONUs communicating to an upstream active splitter. Outlined below is a method to set the output level of each of the reverse transmitters such that each transmitter provides the same photocurrent on the detector to which it is coupled. During normal operation, the active splitter receiver monitors the detector currents during bursts to enable issuance of a warning in case an optical link degrades or is lost.

For a 1310 nm reverse link from the active splitter to an upstream active splitter, the reverse laser power typically needs to be controlled from either 3-10 dBm or 6-10 dBm, depending on the design of the active splitter receiver. For a 1610 nm reverse link, these figures are typically 3-7 dBm or 6-7 dBm, respectively. These controls ensure that the power received at the end of a 25 km link, with some WDM loss, is at least 0 dBm. It should be understood that the numbers given are examples. The active splitter can transmit information in the forward direction through pump modulation of the EDFA or injection of a signal into the forward path. The latter is more expensive; the former results in a lower data rate, as only a minimal pump fluctuation can be allowed without affecting the forward path. A low data rate is sufficient, and can be read by a simple receiver—for instance a remote controller receiver operating in the kHz range coupled to a low cost processor. It should be understood that the downstream transmit function is only required in upstream active splitter units unless ONUs are being controlled as well. In the figures shown, that would be one out of 33 active splitter units in the system.

In a self-calibration run, the upstream active splitter unit transmits a command downstream to active splitter units to initiate self-calibration. Subsequently the downstream units randomly turn their transmitters on and off at full power with a low duty cycle, such that in nearly all cases at most one of the downstream units is on. The upstream active splitter reports information downstream as to which port is on, and what detector current it has obtained from that unit. The downstream units record that information in non-volatile memory; since it can correlate the messages to its own activity, this provides information to the downstream unit as to what port it is on and what power it provided to that port. After all ports have been on at least once, or a time out has occurred (for instance if one or more ports are not connected), the upstream active splitter unit determines which downstream active splitter produces the smallest detector current. Next, the upstream active splitter computes how the upstream powers of each of the downstream units should be set, such that all detector currents are the same and fall within a specified range. That range can for instance correspond to 0-3 dBm (or 6 dBm) input power at the detectors. It should be understood that this can be accomplished by setting a photodetector current, and does not require measurement of an exact optical input power.

Generally, the active splitter upstream unit will set this power to the best (or maximum) value that can be obtained to optimize the SNR of the links. The active splitter units will then all have a known output power, and their internal gain will accordingly be set to have a calibrated modulation index for a given input power and modulation index. All links into an upstream active splitter may behave identically. The upstream active splitter unit may then take the downstream units out of calibration mode.

In case an additional port is lit up on an upstream active splitter receiver port, then the self-calibration algorithm can proceed without service interruption of already connected active splitter units. This is achieved by activating self-calibration on the downstream active splitter receiver that has just been activated by requesting calibration mode only for units with unknown port number (that is only the new unit). Its output will turn on and the upstream active splitter unit will then assign a port number to the new, hitherto unused port and set a power to the new unit, and take it out of calibration mode.

During normal operation, the upstream active splitter unit continues to monitor receiver currents for the incoming upstream links. If there is significant deviation, it may still issue a non-calibration mode downstream command to re-adjust power, and it can also signal plant issues upstream.

The active splitter units operated in the disclosed manner can also build a map of connected active splitter units. Also, a map can be created of upstream power from connected ONUs and statistics on individual ONU operation and link loss can be collected, for instance to locate chattering ONUs or poor ONU connections.

The head end transmitter can also send a command to downstream active splitter units to initiate calibration or change a mode of operation (for instance from 200 MHz to 1200 MHz optimized operation). Any other type of bidirectional EMS system monitoring can be envisioned for active splitter units that can receive and transmit low data rate traffic. It should be understood that this does not require complex or costly HFC EMS systems; minor optical power fluctuations by either pump power variation or low level signal injection in the downstream signal path, or reverse laser power variation in the upstream path, are sufficient to detect binary or kHz range (like remote control chips) modulated data patterns. It should also be understood that the most expensive option—injection of a downstream optical signal—is only relevant at the head end, or in the upstream path typically only relevant in 1 out of 33 active splitter locations.

Another important consideration is that the CMTS should set up modem levels correctly. In regular return or RFoG systems, there is considerable uncertainty in system levels due to RF components or applied combiner networks. In the active splitter system, however, there are no RF components in the link, the service group is aggregated in the optical domain, and only one low gain, low performance, and low output level receiver is required which is coupled directly to the CMTS return port. In some embodiments, it may be desirable to produce a dedicated active splitter receiver with an accurately calibrated output level as a function of input modulation index. Such a receiver has no need for a wide input range; −3 to +3 (or 0 to +6) dBm is sufficient. The high input level implies that the gain can be low. The absence of RF combining following the receiver also means that the output level can be low. Therefore, such a receiver should be obtainable in a high density, low power form factor. With such a receiver, little if any RF wiring may be required in the head end, and the CMTS can accurately set reverse levels to obtain the correct optical modulation index. In some cases, there may be a need to connect other equipment than the CMTS to the reverse path. The receiver may use an auxiliary output to provide for this functionality, rather than the main output with external RF splitters. This eliminates any level uncertainty due to RF components between the receiver and the CMTS.

Embodiments

Some embodiments of the foregoing disclosure may encompass multiple cascaded active splitters that are configured to work with ONUs based primarily on optical input levels without requiring bidirectional communication. Other embodiments may encompass multiple cascaded active splitters that are configured to work with ONUs by using bidirectional communication.

Some embodiments of the foregoing disclosure may include an active splitter with multiple optical inputs, each providing an optical input to one or more detectors that together output a combined signal to a high pass filter that presents a low impedance to the detectors and rejects all signals below an RF frequency band and passes all signals above an RF frequency band before presenting the combined signal to an amplifier and a re-transmitting laser.

Some embodiments of the foregoing disclosure may include an active splitter with multiple optical inputs, each providing an optical input to one or more detectors that together output a combined signal, where the active splitter has a bias circuit with a sufficiently low impedance at low frequency such that all detectors can be illuminated at the same time without a significant drop in bias to the detectors.

Some embodiments of the foregoing disclosure may include an active splitter with a reverse laser where the reverse laser turns on when a photocurrent at the active splitter input detectors is above a threshold, and where the slew rate when the laser turns on is limited such that it does not create a transient having a spectrum that interferes with the upstream spectrum to be transmitted.

Some embodiments of the foregoing disclosure may include an RFoG active splitter architecture where reverse lasers of the active splitter(s) and/or ONUs connected to the active splitter(s) are operated with a continuous output. Some embodiments of the foregoing disclosure may include an RFoG active splitter architecture where reverse lasers of the active splitter(s) and/or ONUs connected to the active splitter(s) are operated between a high and a low power mode such that the output power is high during bursts of upstream transmission and is otherwise low in output. Some embodiments of the foregoing disclosure may include an RFoG active splitter architecture where reverse lasers of the active splitter(s) and/or ONUs connected to the active splitter(s) may be selectively set to either one of a continuous mode and a burst mode.

Some embodiments of the foregoing disclosure may include an RFoG ONU that switches between a high and a low output power state where the output power is high during burst transmission of information and where the low output power state is above the laser threshold.

Some embodiments of the foregoing disclosure may include an RFoG system that measures detector currents at all inputs, building a table of detector currents during high and low (or no) input power to the optical inputs and computes, based on that table, a gain value such that a modulation index of the reverse transmitting laser has a known relation to a modulation index at the optical inputs to the active splitter, such that the reverse transmitting laser has an optimal modulation index but clipping is prevented, even for the port with the highest optical input. In some embodiments of the foregoing disclosure, the optimal modulation index of the reverse transmitter is nominally the same as that for the optical inputs.

Some embodiments of the foregoing disclosure may include an RFoG ONU with an RF signal detector that detects bursts of input signals and activates a laser at a high power mode when a burst is detected and otherwise activates the laser at a low power mode, such as zero power. An electrical attenuator may precede the laser driver and may attenuate an RF input signal, such that in the low output power state the laser cannot be clipped by an RF input signal. The RF attenuation before the laser may be reduced as the laser power increases from the low power state, such that the RF attenuation is rapidly removed to have minimal impact on the burst but during the transition, the laser still is not clipped.

Some embodiments of the foregoing disclosure may include an RFoG ONU with an RF signal detector that detects bursts of input signals and includes an electrical attenuator that precedes the laser driver to attenuate the RF input signal, such that when no nominal input is present noise funneling by the ONU of weak noise signals into the ONU is prevented and RF attenuation is rapidly removed when a burst is detected to have minimal impact on the burst.

Some embodiments of the foregoing disclosure may include an RFoG ONU that can receive a downstream signal instructing it to adjust output power level, RF gain or both. In some embodiments, such an ONU can receive assigned port numbers and status monitoring requests. In some embodiments, such an ONU can transmit upstream information such as status, serial number, etc.

Some embodiments of the foregoing disclosure may include an active splitter that can transmit a downstream signal with requests to downstream units to adjust optical power level, gain or to request status information. Some embodiments may include an active splitter that can receive such downstream signals. Some embodiments may include an active splitter that can transmit and/or receiver such signals in the upstream direction, as well.

Some embodiments of the foregoing disclosure may include an ONU with an RF detector, an attenuator, a bias circuit, and a microcontroller where the microcontroller estimates laser clipping based on measured RF power levels and tracks what fraction of the time the laser is clipping and increases attenuation in case this fraction exceeds a threshold. The microcontroller may also adjust laser bias to prevent clipping. In some embodiments, the microcontroller brings attenuation to a nominal value when RF power to the laser is at or below a nominal value. In some embodiments, changes in attenuation made by the microcontroller take place in discrete steps in time and magnitude.

In some embodiments of the foregoing disclosure the microcontroller may set the attenuation to a high enough level to prevent clipping but less than needed to obtain a nominal modulation index.

Some embodiments of the foregoing disclosure may include a bidirectional RF-over-fiber architecture with more than one re-transmission link in the reverse direction, where detected signals from preceding links are combined at each re-transmission link.

Some embodiments of the foregoing disclosure may include a calibrated receiver at a head-end that provides a specific RF output level for an input modulation index, with a gain control such that for different optical input levels, the RF output level for a given modulation index is held constant. In some embodiments, a receiver may include two outputs, at least one connected to a CMTS without any RF combining and splitting networks.

Some embodiments of the foregoing disclosure may include an active splitter with at least two gain settings, one gain setting optimized for ONUs that can transmit the full reverse spectrum that the system can support, and one setting optimized for ONUs that can transmit an amount of spectrum less than the full spectrum that the system can support, where the active splitter combines inputs from multiple ONUs and can transmit the full spectrum that the system can support.

Some embodiments of the foregoing disclosure may include an active splitter having adjustable reverse transmission power and adjustable gain such that, for a given received upstream signal modulation index, the active splitter maintains a constant optical modulation index irrespective of optical output power. In some embodiments, the retransmitted optical modulation index is the same as the received optical modulation index. In some embodiments, the retransmitted optical modulation index is a predetermined fraction of the received optical modulation index, and the splitter enables an option to vary that fraction.

Some embodiments of the foregoing disclosure may include an active splitter that can receive and decode forward communication signals, e.g. an input-monitoring diode for an EDFA, or another monitoring diode.

Some embodiments of the foregoing disclosure may include an active splitter that can transmit forward communication signals, with for instance a forward laser, or by modulating the pump current of an EDFA.

Some embodiments of the foregoing disclosure may include an active splitter that can receive and decode upstream communication signals, e.g. by monitoring upstream detector currents. Some embodiments of the foregoing disclosure may include an active splitter that can transmit upstream communication signals, e.g. by modulating the reverse laser.

Some embodiments of the foregoing disclosure may include a system with at least two active splitters where a first active splitter instructs a second active splitter to adjust its reverse transmission power level. Some embodiments may use an algorithm to equalize and optimize the reverse transmit level of all downstream active splitters connected to an upstream active splitter. In some embodiments, the algorithm is executed automatically at start up such that downstream active splitters (and optionally ONUs) obtain an address and optionally report in the upstream direction the splitter's (or ONU's) serial number and status. In some embodiments, later activation of ports in the splitter leads to an automatic calibration of new ports without interrupting the service of existing ports, and with continuous monitoring of port health.

Some embodiments of the foregoing disclosure may include an active splitter capable of upstream communication, and capable of receiving and decoding upstream communications from another splitter.

In some embodiments, an active splitter may establish a map of the system in which it is included, and may report system status and topology information to a head end and may issue alarms if necessary. The map may include serial numbers of active splitters, and may include serial numbers of connected ONUs. Some embodiments may create a system map automatically, and (i) may monitor ONU link input levels to active splitters; (ii) may detect chattering or otherwise defective ONUs and optionally instruct active splitter to shut down detectors of defective or chattering ONUs; and/or (iii) may monitor the status of the active splitter that construct the map. In some embodiments, the monitoring function is used to automatically trigger route redundancy by monitoring upstream traffic on a link, to determine if the link is intact, and if the link is found to be defective, switching downstream traffic to an alternate upstream link. In some embodiments, upstream active splitters monitor downstream active splitters by communicating with downstream active splitters.

Some embodiments of the foregoing disclosure may include a head end that instructs downstream active splitters to initiate a self-calibration procedure.

Some embodiments include a combiner that can monitor each of the upstream input ports and thus detect a loss of a link to such a port. The loss of an upstream link implies that the associated downstream link has been lost. Detection of a link can be used to initiate switching over to a redundant fiber link, preferably following a different fiber route.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. An apparatus comprising:
a receiver having a plurality of inputs, each capable of receiving an upstream optical signal, and combining the received upstream optical signals to create a combined signal;
a transmitter that receives the combined electrical signal and converts it to a reverse path optical signal at an output; and
a controller for the transmitter that monitors each of the plurality of inputs, and activates the transmitter if an optical signal above a threshold is received at any of said plurality of inputs, where the controller monitors the sum of the signals received over all of said plurality of inputs.

2. The apparatus of claim 1 where the controller monitors the optical power from each of said plurality of inputs to adjust at least one of the gain to the transmitter and the output power of the transmitter.

3. The apparatus of claim 1 where the receiver, transmitter, and controller are in an active optical combiner that receives respective signals from a plurality of Optical Network Units (ONUs).

4. The apparatus of claim 1 where the controller, in response to detected optical input power, controls at least one of laser bias control between a low state and a high state, amplifier bias control between a low state and a high state, and RF gain, where the high state is activated when optical input power is detected and the low state is between zero and the high state.

5. The device of claim 4 where the device switches output power to a high state from a low state when input optical power is detected and where the low state is between zero and the high state.

6. An apparatus comprising:
a receiver having a plurality of inputs, each capable of receiving an upstream optical signal, and combining the received upstream optical signals to create a combined signal;
a transmitter that receives the combined electrical signal and converts it to a reverse path optical signal at an output; and
a controller for the transmitter that monitors each of the plurality of inputs, and activates the transmitter if an optical signal above a threshold is received at any of said plurality of inputs, where the controller, in response to detected optical input power, controls at least one of: laser bias control between a low state and a high state, amplifier bias control between a low state and a high state, or RF gain,
where the high state is activated when optical input power is detected and the low state is between zero and the high state.

7. The apparatus of claim 6 where the controller monitors the sum of the signals received over all of said plurality of inputs.

8. The apparatus of claim 6 where the controller monitors the optical power from each of said plurality of inputs to adjust at least one of the gain to the transmitter and the output power of the transmitter.

9. The apparatus of claim 6 where the receiver, transmitter, and controller are in an active optical combiner that receives respective signals from a plurality of Optical Network Units (ONUs).

10. The device of claim 6 where the device switches output power to a high state from a low state when input optical power is detected and where the low state is between zero and the high state.

* * * * *

UNITED STATES PATENT AND TRADEMARK OFFICE
CERTIFICATE OF CORRECTION

| | |
|---|---|
| PATENT NO. | : 9,444,549 B2 |
| APPLICATION NO. | : 14/625613 |
| DATED | : September 13, 2016 |
| INVENTOR(S) | : Schemmann et al. |

It is certified that error appears in the above-identified patent and that said Letters Patent is hereby corrected as shown below:

In the Specification

Column 3
Line 50 "signals requires" should read -- signals require --

Column 5
Line 44 "as EFDA" should read -- as EDFA --

Column 5
Line 49 "an EFDA" should read -- an EDFA --

Column 5
Line 52 "the EFDA" should read -- the EDFA --

Column 10
Line 33 change "light received is received is bursty" to delete the redundant "received is"

Column 14
Line 1 "turn-on time 560" should read -- turn-on time 660 --

Column 14
Line 27 "turn-on 560" should read -- turn-on 660 --

Column 17
Line 4 remove the "." after "As an alternative." and replace with a -- , --

Signed and Sealed this
Eleventh Day of July, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,444,549 B2

In the Claims

Column 28
Claim 1
Line 20 "electrical" should read -- combined electrical signal --

Column 28
Claim 2
Line 31 should remove the word "the"

Column 28
Claim 5
Line 45 should remove the word "device" and replace with "apparatus"

Column 28
Claim 6
Line 53 "electrical" should read -- combined electrical signal --